(12) United States Patent
de Oliveira e Silva et al.

(10) Patent No.: US 12,270,492 B2
(45) Date of Patent: Apr. 8, 2025

(54) SEALED PIPELINE CONNECTION AND RAISED PIPELINE SLEEVE, AND METHOD OF MAKING SAME

(71) Applicant: LPS IP LLC, Rancho Cucamonga, CA (US)

(72) Inventors: Jose Anisio de Oliveira e Silva, Belo Horizonte (BR); Ryan Michael Sears, Costa Mesa, CA (US)

(73) Assignee: LPS IP, LLC, Rancho Cucamonga, CA (US)

( * ) Notice: Subject to any disclaimer, the term of this patent is extended or adjusted under 35 U.S.C. 154(b) by 0 days.

(21) Appl. No.: 18/019,774

(22) PCT Filed: Aug. 4, 2021

(86) PCT No.: PCT/US2021/044427
§ 371 (c)(1),
(2) Date: Feb. 3, 2023

(87) PCT Pub. No.: WO2022/031769
PCT Pub. Date: Feb. 10, 2022

(65) Prior Publication Data
US 2023/0304612 A1   Sep. 28, 2023

Related U.S. Application Data

(60) Provisional application No. 63/165,080, filed on Mar. 23, 2021, provisional application No. 63/061,786, filed on Aug. 5, 2020.

(51) Int. Cl.
*F16L 13/02* (2006.01)
(52) U.S. Cl.
CPC ................... *F16L 13/0227* (2013.01)

(58) Field of Classification Search
CPC . F16L 13/0227; F16L 13/181; F16L 13/0263; F16L 15/10; F16L 19/04;
(Continued)

(56) References Cited

U.S. PATENT DOCUMENTS 2,188,925 A   2/1940   Bela
2,372,712 A   4/1945   Crawford
(Continued)

FOREIGN PATENT DOCUMENTS

AR   034477 A1   2/2004
AU   5373290 A   10/1990
(Continued)

OTHER PUBLICATIONS

Notification of Transmittal of the International Search Report & Written Opinion, dated Nov. 12, 2021, pp. 1-9.
(Continued)

*Primary Examiner* — Eugene G Byrd
*Assistant Examiner* — L. Susmitha Koneru
(74) *Attorney, Agent, or Firm* — Victor H. Segura

(57) ABSTRACT

A raised pipeline sleeve for a pipeline includes a tubular sleeve body insertable into pipeline pipes. Recessed sleeve shoulders are radially positioned about each end of the tubular sleeve body with a central portion therebetween. An outer surface of the tubular sleeve body along the central portion is shaped to conform to an inner surface of the pipeline pipes. The recessed sleeve shoulders are recessed a distance radially below the central portion to support a pipeline seal between the recessed sleeve shoulders and the pipeline pipes. A raised hump extends radially from the central portion along the outer surface of the tubular sleeve body. As the tubular sleeve body is inserted in the pipeline pipes, the pipeline pipes engage the raised hump and conform the raised hump to the inner surface of the pipeline (Continued)

pipes whereby installation of the tubular sleeve body into and alignment of the tubular sleeve body about the pipeline pipes is facilitated.

32 Claims, 23 Drawing Sheets

(58) Field of Classification Search
CPC . F16L 23/20; F16L 15/02; F16L 17/06; F16L 17/08; F16L 17/0212; F16L 17/0218
See application file for complete search history.

(56) References Cited

U.S. PATENT DOCUMENTS

| | | | |
|---|---|---|---|
| 2,646,995 A | 7/1953 | Thompson | |
| 2,764,426 A | 9/1956 | Ahrens | |
| 2,794,758 A | 6/1957 | Harper et al. | |
| 2,895,747 A | 7/1959 | Julius et al. | |
| 2,919,936 A * | 1/1960 | Hurley | F16L 23/125 |
| | | | 285/55 |
| 3,132,236 A | 5/1964 | Deininger | |
| 3,142,499 A | 7/1964 | Lang | |
| 3,192,612 A | 7/1965 | Elliott et al. | |
| 3,195,931 A | 7/1965 | Braunagel | |
| 3,217,922 A | 11/1965 | Glasgow | |
| 3,235,291 A | 2/1966 | Lewis | |
| 3,266,820 A | 8/1966 | Fernand et al. | |
| 3,284,108 A | 11/1966 | West | |
| 3,325,191 A | 6/1967 | Dick | |
| 3,453,004 A | 7/1969 | Toelke et al. | |
| 3,467,410 A | 9/1969 | Chandler | |
| 3,508,766 A | 4/1970 | Kessler et al. | |
| 3,516,689 A | 6/1970 | Binford et al. | |
| 3,537,731 A | 11/1970 | Reddy | |
| 3,653,688 A * | 4/1972 | Sakakibara | F16L 17/025 |
| | | | 403/303 |
| 3,817,805 A | 6/1974 | Surikov et al. | |
| 3,890,483 A | 6/1975 | Webster | |
| 3,955,834 A | 5/1976 | Ahlrot | |
| 3,965,555 A | 6/1976 | Webster et al. | |
| 3,972,466 A | 8/1976 | Keith | |
| 4,182,519 A | 1/1980 | Wilson | |
| 4,277,091 A | 7/1981 | Hunter | |
| 4,400,019 A | 8/1983 | Fruck | |
| 4,611,833 A | 9/1986 | Lescaut | |
| 4,619,470 A | 10/1986 | Overath et al. | |
| 4,635,967 A | 1/1987 | Stephenson | |
| 4,640,532 A | 2/1987 | Pope | |
| 4,768,278 A * | 9/1988 | Pickering | B29C 66/81431 |
| | | | 277/924 |
| 4,913,465 A | 4/1990 | Abbema et al. | |
| 5,009,737 A | 4/1991 | Lescaut | |
| 5,009,797 A | 4/1991 | Penny et al. | |
| 5,052,608 A | 10/1991 | McClure | |
| 5,104,152 A * | 4/1992 | Galfant | F16L 58/181 |
| | | | 285/55 |
| 5,114,190 A * | 5/1992 | Chalmers | F16L 19/0231 |
| | | | 285/423 |
| 5,163,715 A | 11/1992 | Rickard et al. | |
| 5,219,187 A | 6/1993 | Mikitka | |
| 5,282,652 A * | 2/1994 | Werner | F16L 58/182 |
| | | | 285/55 |
| 5,346,261 A | 9/1994 | Abbema | |
| 5,348,211 A | 9/1994 | White et al. | |
| 5,405,171 A | 4/1995 | Allen et al. | |
| 5,480,196 A | 1/1996 | Adams, Jr. | |
| 5,547,228 A | 8/1996 | Abbema et al. | |
| 5,566,984 A * | 10/1996 | Abbema | F16L 13/0263 |
| | | | 285/55 |
| 5,566,986 A | 10/1996 | Allen et al. | |
| 5,584,512 A | 12/1996 | Carstensen | |
| 5,634,672 A | 6/1997 | Stack et al. | |
| 5,685,572 A | 11/1997 | Linton et al. | |
| 5,779,276 A | 7/1998 | Allen | |
| 5,863,078 A | 1/1999 | Ball | |
| 5,964,981 A | 10/1999 | Nelson et al. | |
| 5,984,370 A | 11/1999 | Lewis | |
| 5,992,897 A | 11/1999 | Hill et al. | |
| 6,226,855 B1 | 5/2001 | Maine | |
| 6,294,042 B1 | 9/2001 | Nelson et al. | |
| 6,357,802 B1 | 3/2002 | Nozato et al. | |
| 6,375,226 B1 | 4/2002 | Dickinson et al. | |
| 6,719,186 B2 | 4/2004 | Mudge et al. | |
| 6,739,632 B1 | 5/2004 | Thomas et al. | |
| 6,863,313 B1 * | 3/2005 | DeLange | E21B 17/042 |
| | | | 285/55 |
| 6,926,283 B2 * | 8/2005 | Janoff | F16L 23/20 |
| | | | 277/606 |
| 7,080,667 B2 | 7/2006 | McIntyre | |
| 7,344,161 B2 | 3/2008 | Howard et al. | |
| 7,431,341 B2 | 10/2008 | McIntyre | |
| 7,722,085 B2 | 5/2010 | Pionetti | |
| 7,908,732 B2 | 3/2011 | Alliot et al. | |
| 8,186,685 B2 * | 5/2012 | Martin | E21B 33/1212 |
| | | | 277/645 |
| 8,256,089 B2 | 9/2012 | Pionetti | |
| 8,397,766 B2 | 3/2013 | Rosen | |
| 8,398,119 B2 | 3/2013 | Kenworthy | |
| 8,596,692 B1 * | 12/2013 | Gourlay | F16L 23/04 |
| | | | 285/365 |
| 8,622,094 B2 | 1/2014 | Dorsch et al. | |
| 8,714,597 B2 | 5/2014 | Venable et al. | |
| 8,794,637 B2 * | 8/2014 | Martin | F16L 23/18 |
| | | | 277/645 |
| 8,942,552 B2 | 1/2015 | Pionetti et al. | |
| RE45,518 E * | 5/2015 | Martin | F16L 23/18 |
| | | | 277/645 |
| 9,377,148 B2 | 6/2016 | Barnes | |
| 9,599,257 B2 | 3/2017 | Raber | |
| 9,915,383 B2 | 3/2018 | Compton et al. | |
| 9,982,814 B1 * | 5/2018 | Carstensen | E21B 33/10 |
| 10,047,892 B2 | 8/2018 | Barnes | |
| 10,274,108 B2 | 4/2019 | Barnes | |
| 10,533,690 B2 | 1/2020 | Barnes | |
| 10,562,235 B2 | 2/2020 | Pionetti et al. | |
| 11,047,513 B2 | 6/2021 | Barnes | |
| 11,067,467 B2 * | 7/2021 | Gamache | F16L 19/103 |
| 11,092,262 B2 | 8/2021 | Chalmers et al. | |
| 11,338,526 B2 | 5/2022 | Pionetti et al. | |
| 11,572,967 B2 | 2/2023 | Yakovchev et al. | |
| 2002/0157718 A1 | 10/2002 | Mason | |
| 2004/0070199 A1 | 4/2004 | Trivelli | |
| 2005/0189028 A1 | 9/2005 | Burkes | |
| 2005/0225089 A1 | 10/2005 | Ben-Horin | |
| 2005/0246883 A1 | 11/2005 | Alliot et al. | |
| 2006/0145479 A1 | 7/2006 | McIntyre | |
| 2006/0186602 A1 * | 8/2006 | Martin | E21B 33/1212 |
| | | | 277/338 |
| 2007/0284872 A1 | 12/2007 | Pionetti | |
| 2010/0207380 A1 | 8/2010 | Venable et al. | |
| 2011/0094613 A1 | 4/2011 | Rosen | |
| 2011/0193339 A1 | 8/2011 | Kenworthy | |
| 2013/0240076 A1 | 9/2013 | Van Der Graaf | |
| 2013/0292936 A1 | 11/2013 | Rosen | |
| 2014/0047176 A1 | 2/2014 | Poddar | |
| 2014/0103638 A1 | 4/2014 | Compton et al. | |
| 2014/0116518 A1 | 5/2014 | Burkes | |
| 2014/0252757 A1 | 9/2014 | Raber | |
| 2015/0260318 A1 | 9/2015 | Goess-Saurau et al. | |
| 2016/0298811 A1 | 10/2016 | Burkes | |
| 2017/0045162 A1 | 2/2017 | Raber | |
| 2019/0316721 A1 | 10/2019 | Barnes | |
| 2022/0049800 A1 | 2/2022 | Hallot et al. | |
| 2022/0136624 A1 | 5/2022 | Metcalf et al. | |

FOREIGN PATENT DOCUMENTS

| | | |
|---|---|---|
| BR | 0301867 B1 | 8/2004 |
| BR | 112015022847 A2 | 7/2017 |
| CA | 1006016 A | 3/1977 |
| CA | 1050075 A | 3/1979 |
| CA | 2382454 A1 | 1/2002 |

(56) References Cited

FOREIGN PATENT DOCUMENTS

| | | |
|---|---|---|
| CA | 2431459 A1 | 12/2003 |
| CA | 2460297 A1 | 8/2005 |
| CA | 2817985 E | 5/2012 |
| CA | 2904609 C | 10/2014 |
| CN | 101694261 A | 4/2010 |
| CN | 103899857 A | 7/2014 |
| DE | 660158 C | 5/1938 |
| DE | 1872620 U | 5/1963 |
| DE | 2531932 C3 | 1/1977 |
| DE | 3315819 A1 | 10/1984 |
| EP | 0275055 A3 | 7/1989 |
| EP | 0366299 A3 | 5/1990 |
| EP | 0389462 A1 | 9/1990 |
| EP | 137189 B1 | 3/1991 |
| FR | 2416764 A1 | 9/1979 |
| FR | 2438788 A3 | 5/1980 |
| GB | 410120 A | 5/1934 |
| GB | 410196 A | 5/1934 |
| GB | 722070 A | 1/1955 |
| GB | 1022510 A | 3/1966 |
| GB | 1384614 A | 2/1975 |
| GB | 1444225 A | 7/1976 |
| GB | 1451190 A | 9/1976 |
| GB | 1480061 A | 7/1977 |
| GB | 1533233 A | 11/1978 |
| GB | 2298689 A | 9/1996 |
| GB | 2481065 A | 12/2011 |
| GB | 2481065 B | 12/2011 |
| GB | 2588919 A | 5/2021 |
| OA | 12986 A | 10/2006 |
| RU | 2023930 C1 | 11/1994 |
| RU | 2154221 C1 | 8/2000 |
| RU | 2157479 C1 | 10/2000 |
| RU | 20361 U1 | 10/2001 |
| RU | 2232334 C1 | 7/2004 |
| RU | 2236628 C1 | 9/2004 |
| RU | 2503873 C1 | 1/2014 |
| WO | 9014544 A1 | 11/1990 |
| WO | 1990014544 A1 | 11/1990 |
| WO | 9626384 A1 | 8/1996 |
| WO | 9821513 A1 | 5/1998 |
| WO | 0201103 A1 | 1/2002 |
| WO | 03062691 | 7/2003 |
| WO | 03062691 A1 | 7/2003 |
| WO | 2004011840 A1 | 2/2004 |
| WO | 2004015321 A1 | 2/2004 |
| WO | 2005019719 A1 | 3/2005 |
| WO | 2006109015 A1 | 10/2006 |
| WO | 2009048772 A1 | 4/2009 |
| WO | 2010041016 A1 | 4/2010 |
| WO | 2012069105 A1 | 5/2012 |
| WO | 2013136062 A1 | 9/2013 |
| WO | 2014164862 A1 | 10/2014 |
| WO | 2016001622 A1 | 1/2016 |
| WO | 2016185228 A1 | 11/2016 |

OTHER PUBLICATIONS

Notification of Transmittal of the International Search Report & Written Opinion, dated Nov. 2, 2021, pp. 1-9.

\* cited by examiner

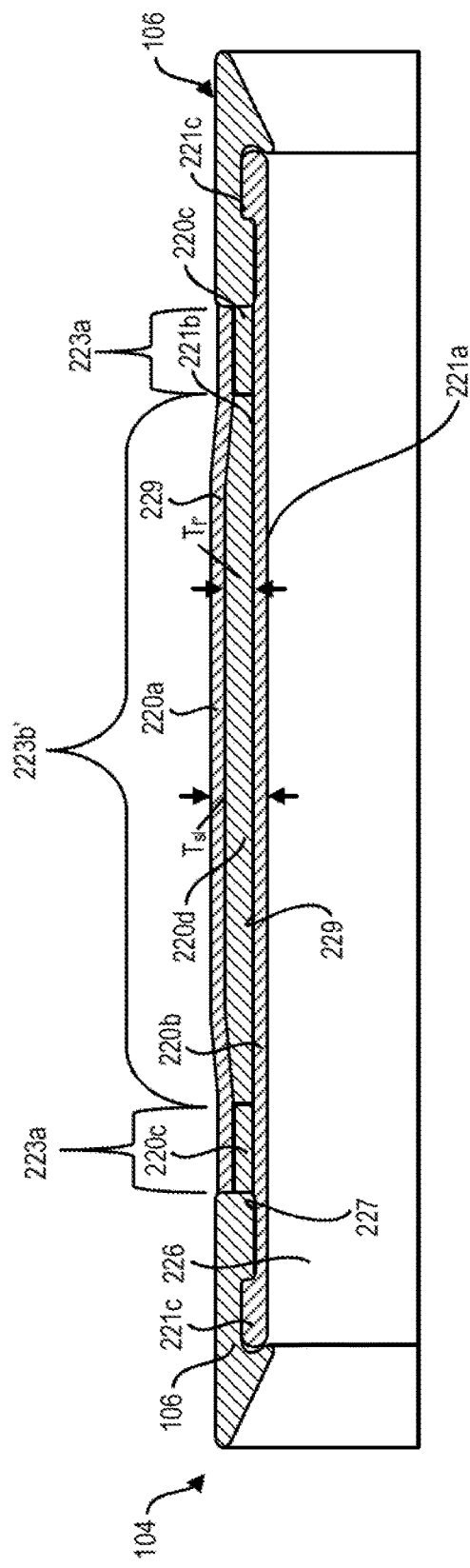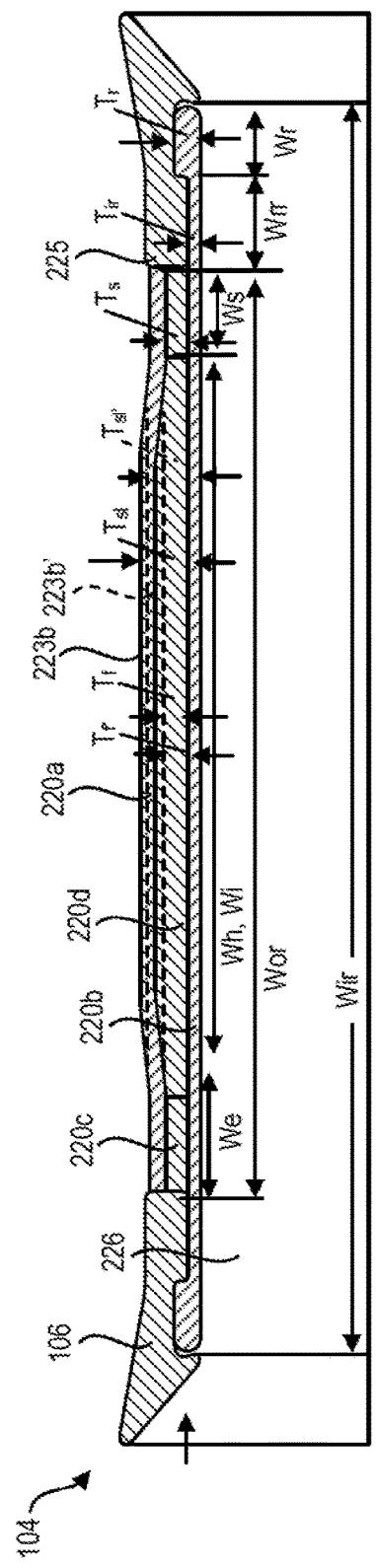
FIG. 4A
FIG. 4B

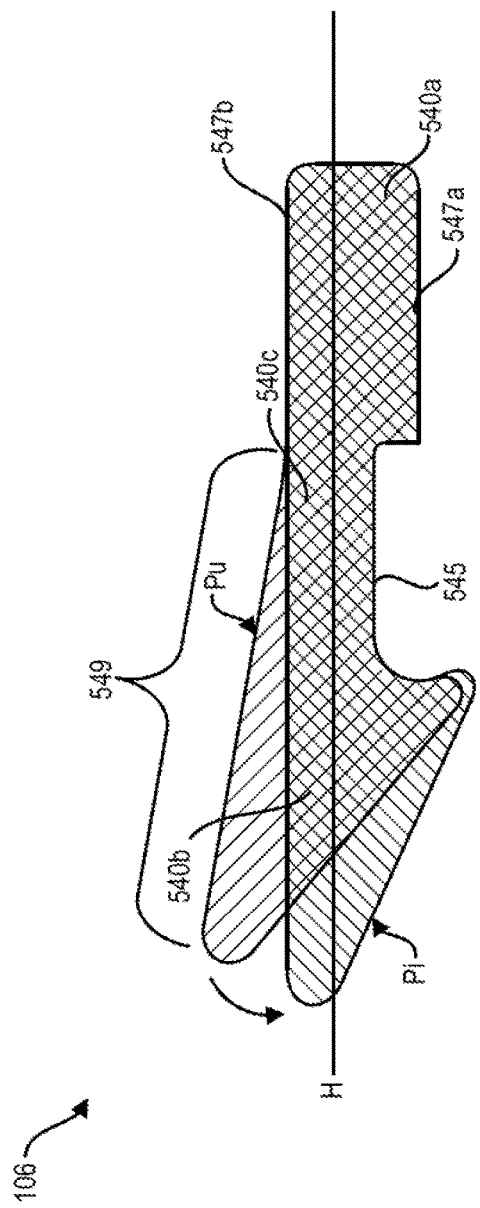
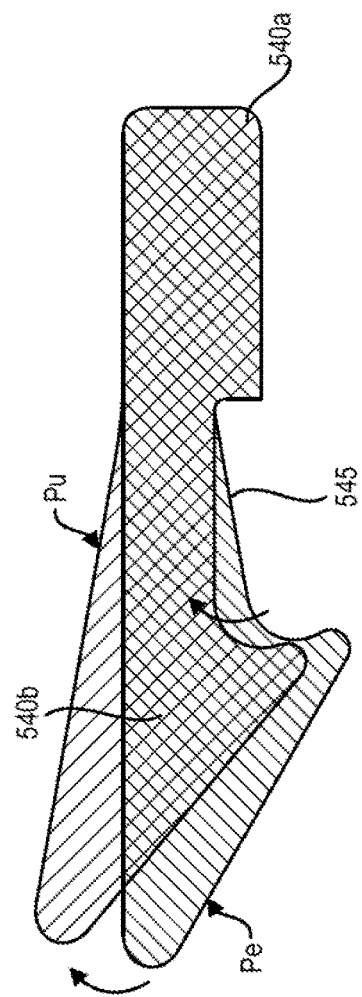

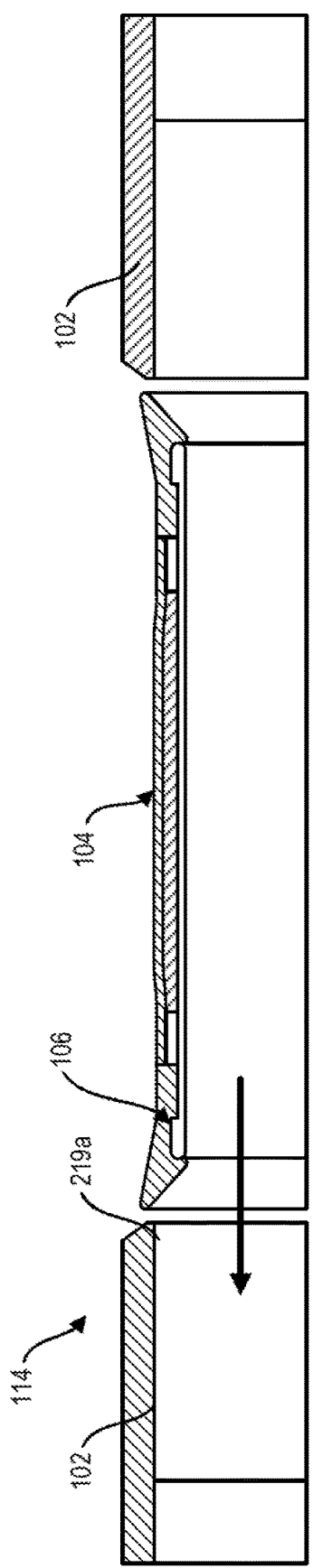
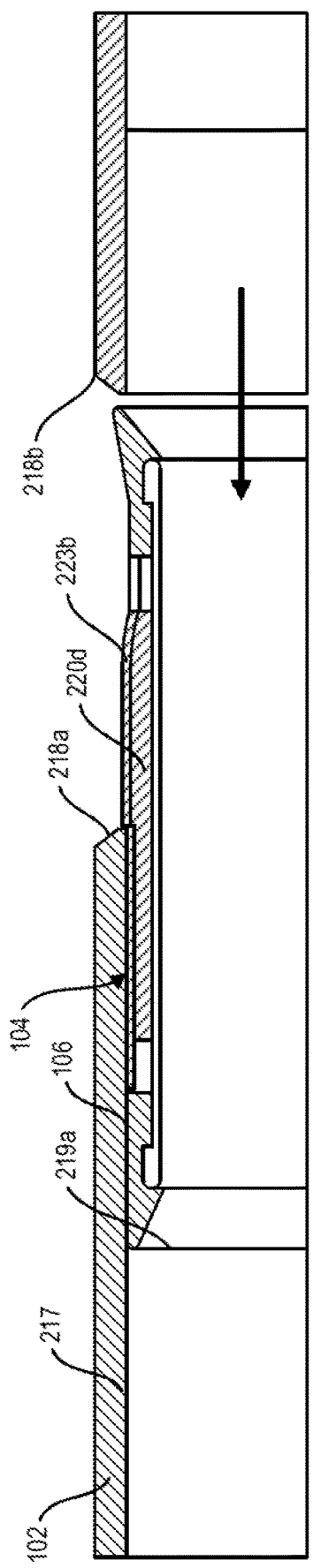
FIG. 9A
FIG. 9B

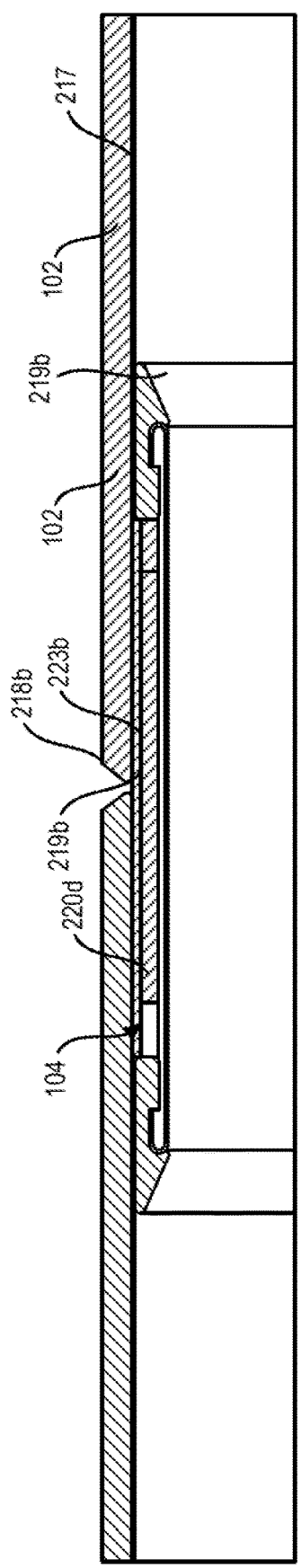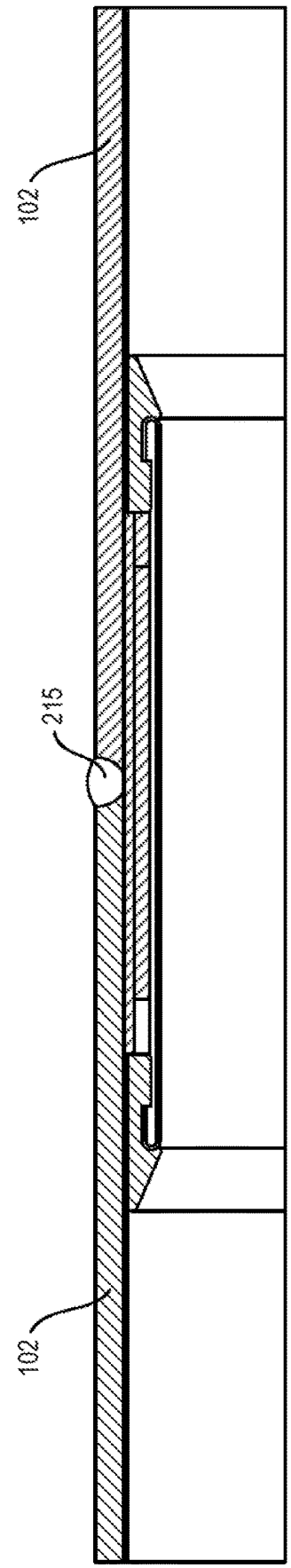
FIG. 9C
FIG. 9D

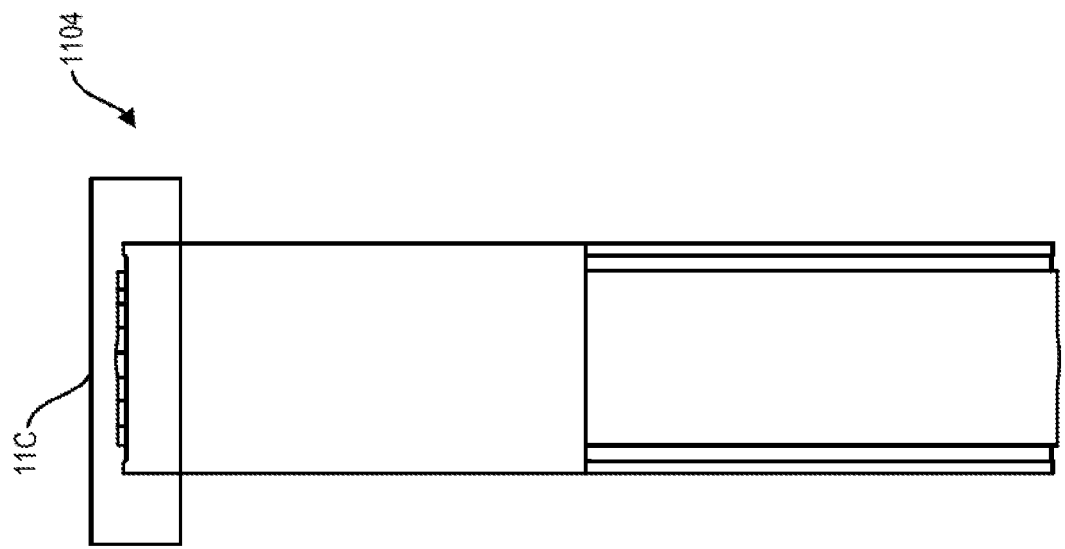
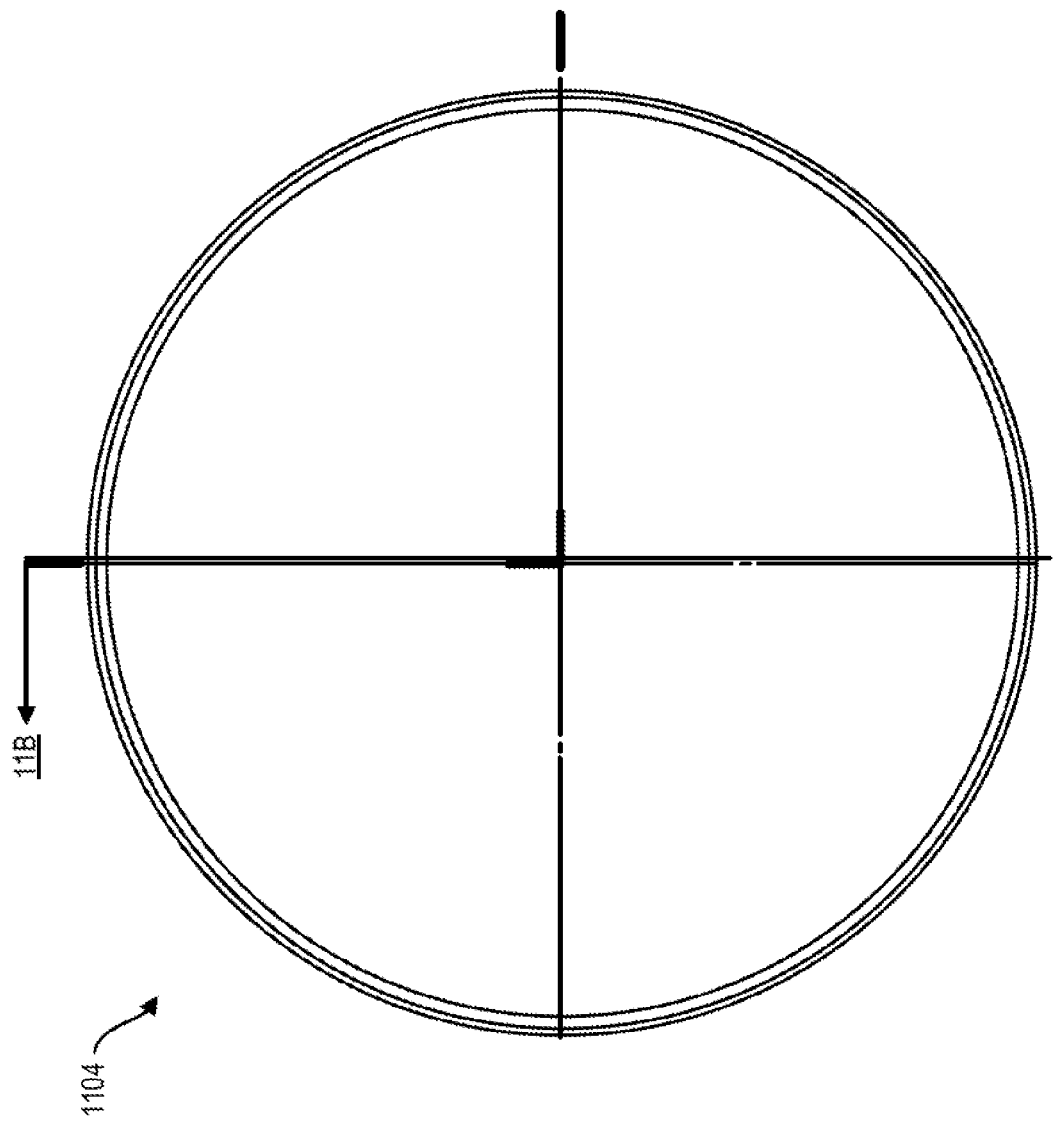
FIG. 11B
FIG. 11A

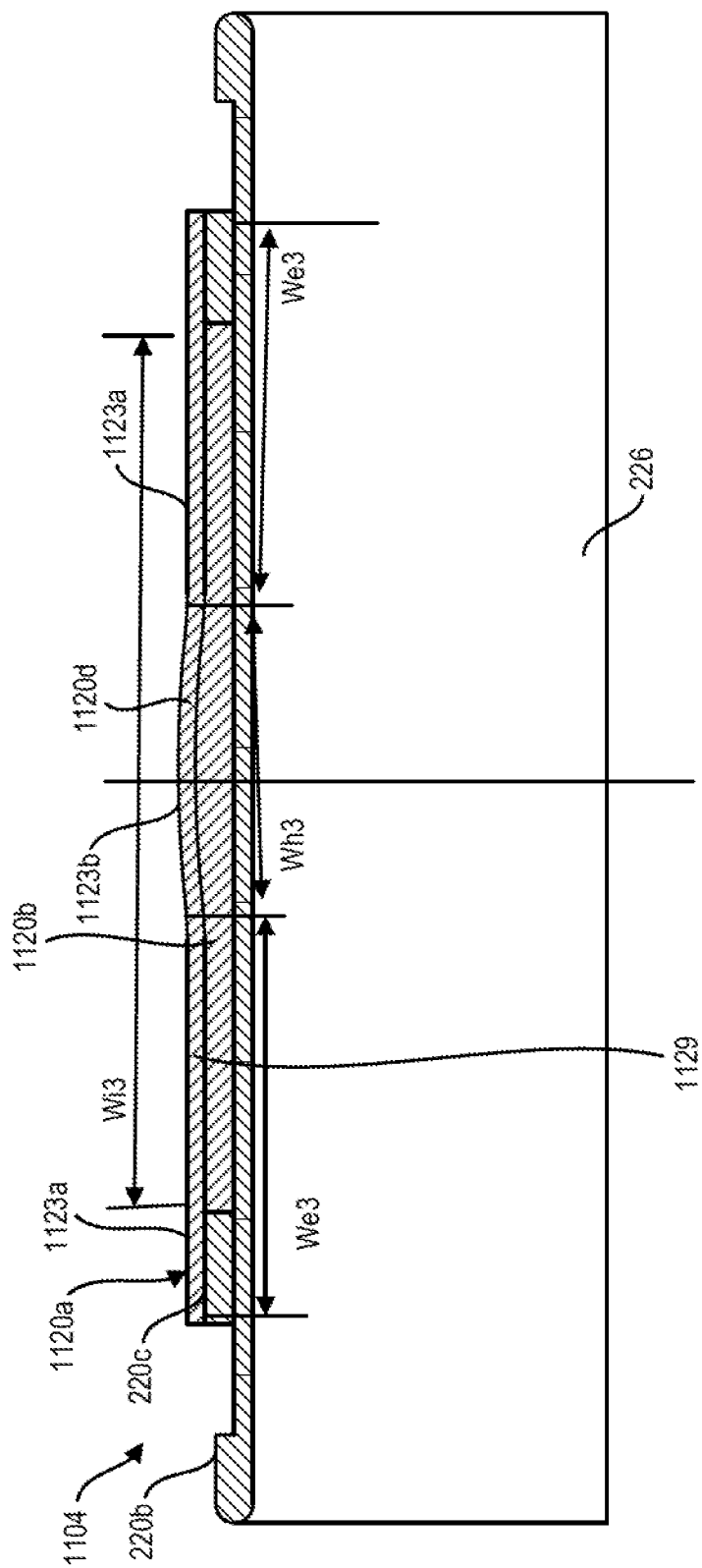

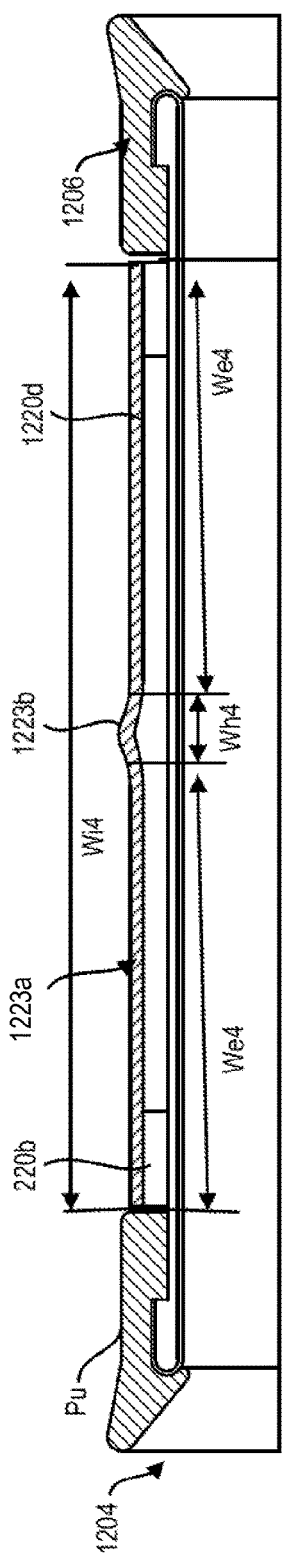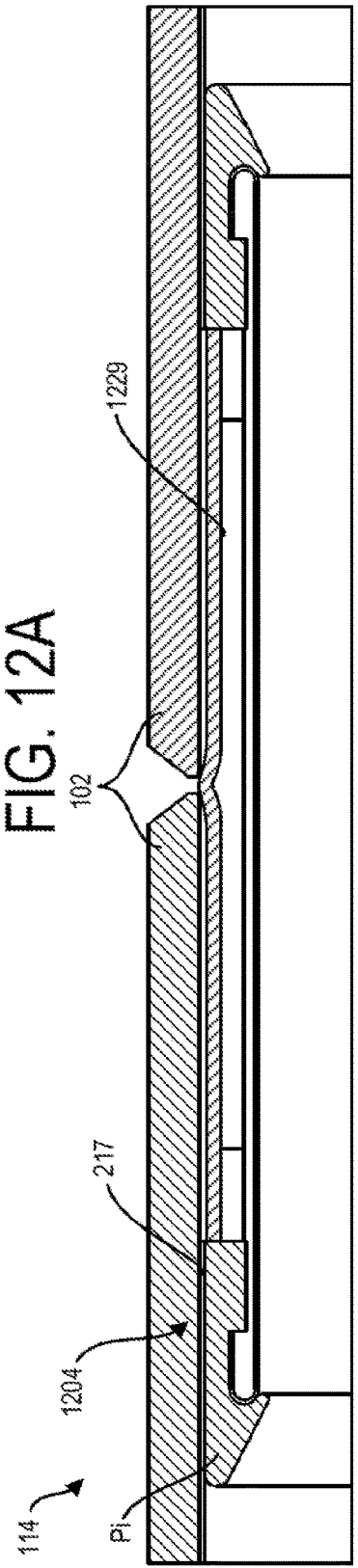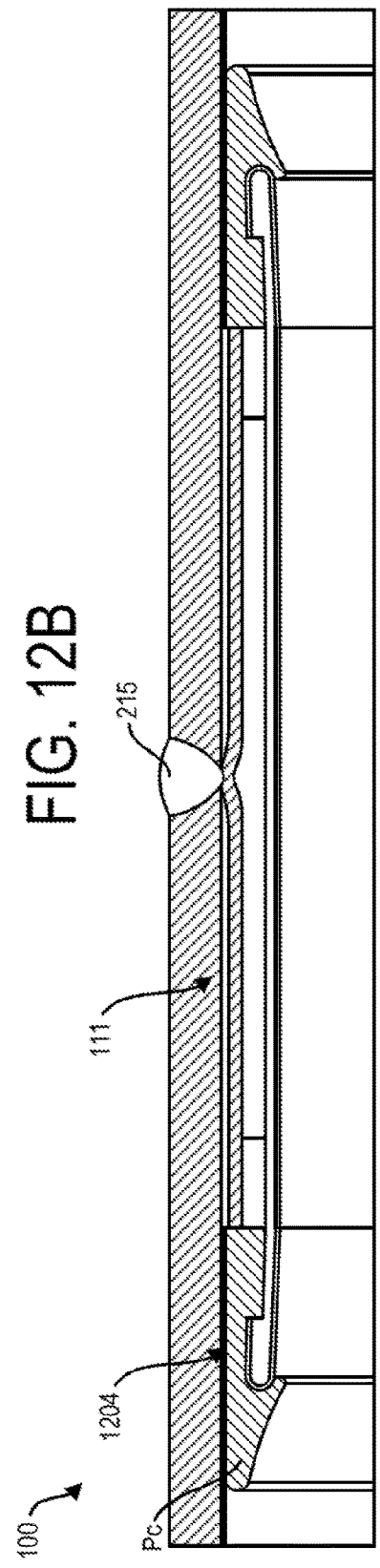

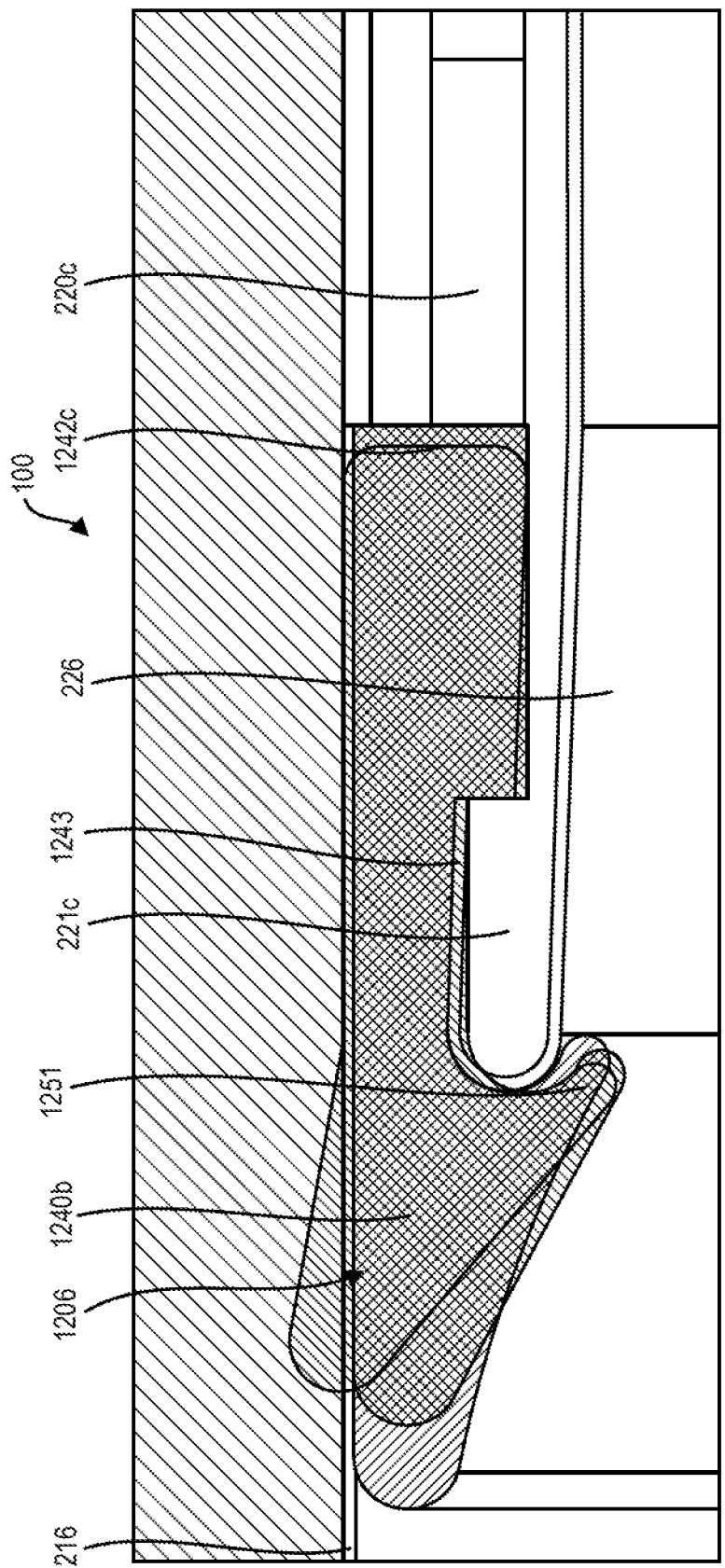

1500 - METHOD OF MAKING A SEALED PIPELINE

1590A - (OPTIONALLY) APPLYING A LINER INSIDE EACH OF THE PAIR OF PIPELINE PIPES

1590B – FORMING A RAISED PIPELINE SLEEVE BY:
- POSITIONING RIMS ON EACH END OF AN INNER RING
- POSITIONING A FLEXIBLE LAYER ON AN OUTER SURFACE OF THE INNER RING
- POSITIONING THE INNER RING WITH THE SPACERS AND THE FLEXIBLE LAYER THEREON INTO AN OUTER RING
- (OPTIONALLY) APPLYING A LINER TO AN INNER SURFACE OF THE INNER RING
- POSITIONING LOCKABLE PIPELINE SEALS ONTO EACH OF THE INNER RING ADJACENT TO THE RIMS

1590C - POSITIONING A FIRST SLEEVE END OF THE RAISED PIPELINE SLEEVE INTO A FIRST PIPE END OF A FIRST OF THE PAIR OF PIPELINE PIPES

1590D - POSITIONING A SECOND SLEEVE END OF A RAISED PIPELINE SLEEVE INTO A SECOND PIPE END OF A SECOND OF THE PAIR OF PIPELINE PIPES

1590E - FORMING A SEALED PIPELINE CONNECTION BETWEEN THE RAISED PIPELINE SLEEVE AND FIRST AND SECOND PIPELINE PIPES BY:

- INSTALLING A FIRST END OF THE RAISED PIPELINE SLEEVE INTO A FIRST END OF A FIRST OF THE PIPELINE PIPES AND INSTALLING A SECOND END OF A SECOND END OF A SECOND OF THE PIPELINE PIPES;
- FORMING A SEAL BETWEEN THE PIPELINE SEAL, THE RAISED PIPELINE SLEEVE, AND EACH OF THE PIPELINE PIPES; AND
- COMPRESSING THE RAISED HUMP AGAINST THE INNER SURFACE OF THE PIPELINE PIPES SUCH THAT THE TUBULAR SLEEVE BODY IS CENTERED RADIALLY ABOUT THE PIPELINE PIPES AND THE CENTRAL PORTION IS URGED INTO SEALING ENGAGEMENT WITH THE PIPELINE PIPES

1590F - WITH THE RAISED PIPELINE SLEEVE POSITIONED THEREIN, SECURING THE FIRST PIPE END OF THE FIRST PIPELINE PIPE TO THE SECOND PIPE END OF THE SECOND PIPELINE PIPE

FIG. 15

SEALED PIPELINE CONNECTION AND RAISED PIPELINE SLEEVE, AND METHOD OF MAKING SAME

CROSS-REFERENCE TO RELATED APPLICATIONS

This application claims the benefit of U.S. Provisional Application No. 63/165,080, filed on Mar. 23, 2021 and U.S. Provisional Application No. 63/061,786 filed on Aug. 5, 2020, the entire contents of which are hereby incorporated by reference herein to the extent not inconsistent with this disclosure.

BACKGROUND

The present disclosure relates generally to pipelines. In particular, the present disclosure relates to sealing techniques for use in pipelines.

Pipelines are used to transport fluids between locations. The pipelines may be formed from a series of tubulars connected together to form a fluid passage for flow of the fluids therethrough. The tubulars may be connected together by connections, such as threads. Examples of connections are provided in Patent/Application Nos. US2007284872, US2006145479, US2005225089, U.S. Pat. Nos. 8,596,692, 7,431,341, 6,357,802, and 5,346,261, the entire contents of which are hereby incorporated by reference herein. To assure good connection between the connected tubulars, the tubulars and the connections may be secured by welds, bonds, or adhesives. Examples are provided in Patent/Application Nos. US2004070199, U.S. Pat. Nos. 6,719,186, 5,984,370, 5,779,276, 5,584,512, 5,566,986, 5,566,984, 9,599,257, 9,909,695, WO2014/164862, WO2019/041016, and PCT/BR2018/050315, the entire contents of which are hereby incorporated by reference herein.

Despite advancements in pipeline technology, there remains a need for effective and efficient techniques for sealing pipelines, and that such techniques allow for ease of manufacture, assembly, and operation.

SUMMARY

In at least one aspect, the disclosure relates to a raised pipeline sleeve for sealing pipeline pipes of a pipeline. The raised pipeline sleeve comprises a tubular sleeve body insertable into the pipeline pipes. Recessed sleeve shoulders are radially positioned about each end of the tubular sleeve body with a central portion therebetween. An outer surface of the tubular sleeve body along the central portion is shaped to conform to an inner surface of the pipeline pipes. The recessed sleeve shoulders are recessed a distance radially below the central portion to support a pipeline seal between the recessed sleeve shoulders and the pipeline pipes. A raised hump extends radially from the central portion along the outer surface of the tubular sleeve body. As the tubular sleeve body is inserted in the pipeline pipes, the pipeline pipes engage the raised hump and conform the raised hump to the inner surface of the pipeline pipes whereby installation of the tubular sleeve body into and alignment of the tubular sleeve body about the pipeline pipes is facilitated.

The raised pipeline sleeve may have one or more of the following features: The central portion has outer ends with the raised hump therebetween, the outer ends having an outer diameter less than an outer diameter of the raised hump, the outer diameter of the outer ends sized to facilitate insertion into the pipeline pipes, the outer diameter of the raised hump sized to limit advancement of the pipeline pipes. When the tubular sleeve body is inserted into the pipeline pipes and the pipeline pipes are moved together, the raised hump defines a bridge between the pipeline pipes, between the central portion of the raised pipeline sleeve and the pipeline pipes. The tubular sleeve body comprises an inner ring and an outer ring. The tubular sleeve body further comprises a flexible layer between the inner ring and the outer ring. The tubular sleeve body further comprises ring spacers between the inner ring and the outer ring, the flexible layer positioned between the inner ring, the outer ring, and the ring spacers. The flexible layer comprises an insulative material. The pipeline seal is receivably positioned about recessed the sleeve shoulders, each of the pipeline seals comprising a ring-shaped body shaped to form a seal between the tubular sleeve body and the pipeline pipes. The ring-shaped body has a head along a first edge of the ring-shaped body and a tail along a second edge of the ring-shaped body with a elongate body between the head and the tail. The ring-shaped body has an outer ring surface and an inner ring surface. A deflection surface is defined along the outer ring surface. The deflection surface is at an angle to a centerline of the ring-shaped body. A grip is defined along the inner ring surface and the elongate body between the head and the tail. The raised pipeline sleeve further comprises a sleeve lining along an inner surface of the tubular sleeve body. Each of the recessed sleeve shoulders comprises a rim and a recess. The recess is positioned between the rim and the central portion. The central portion has a thickness greater than a thickness of the rim and the thickness of the rim is greater than a thickness of the recess. A step is defined between the central portion and each of the recesses. The raised hump is positioned centrally between each of the recessed sleeve shoulders. The raised hump is positioned non-centrally between each of the recessed sleeve shoulders. The raised hump comprises at least one of a peak, an offset hump, a narrow hump, and a wide hump. A width of central portion is greater than or less than a width of the raised hump.

In another aspect, the disclosure relates to a sealed pipeline connection comprising pipeline pipes, a raised pipeline sleeve, and pipeline seals. The pipeline pipes have a fluid passage therethrough. A first end of a first of the pipeline pipes positioned adjacent a second end of a second of the pipeline pipes. The raised pipeline sleeve comprises a tubular sleeve body insertable into the pipeline pipes. Recessed sleeve shoulders are radially positioned about each end of the tubular sleeve body with a central portion therebetween. An outer surface of the tubular sleeve body along the central portion is shaped to conform to an inner surface of the pipeline pipes. The recessed sleeve shoulders are recessed a distance radially below the central portion. A raised hump extends radially from the central portion along the outer surface of the tubular sleeve body. As the tubular sleeve body is inserted in the pipeline pipes, the pipeline pipes engage the raised hump and conform the raised hump to the inner surface of the pipeline pipes whereby installation of the tubular sleeve body into and alignment of the tubular sleeve body about the pipeline pipes is facilitated. The pipeline seals are positioned between the recessed sleeve shoulders and the pipeline pipes.

The sealed pipeline connection may have one or more of the following features: The raised pipeline sleeve extends into the first end of the first of the pipeline pipes and the second end of the second of the pipeline pipes. The pipeline seals are lockable pipeline seals. When compressed fluid passes through the fluid passage, the pipeline seals are compressed against the pipeline pipes and the raised pipeline sleeve. The When the tubular sleeve body is inserted into the pipeline pipes and the pipeline pipes move together, the raised hump defines a bridge between the pipeline pipes and between the pipeline sleeve and the pipeline pipes. At least two of the first of the pipeline pipes, the second of the pipeline pipes, and the raised hump are secured together by a weld. The sealed pipeline connection further comprises a weld between the pipeline pipes and the raised hump.

Finally, in another aspect, the disclosure relates to a method of making a sealed pipeline. The method comprises providing a raised pipeline sleeve having a tubular sleeve body; and installing a pipeline seal onto each of the recessed shoulders of the raised pipeline sleeve. The tubular sleeve body has recessed shoulders at each end with a central portion therebetween. The central portion has a raised hump thereon. The method further comprises forming a sealed pipeline connection between the raised pipeline sleeve and first and second pipeline pipes by: installing a first end of the raised pipeline sleeve into a first end of a first of the pipeline pipes and installing a second end of the raised pipeline sleeve into a second end of a second of the pipeline pipes; forming a seal between the pipeline seals, the raised pipeline sleeve, and the pipeline pipes; and facilitating installation and alignment of the tubular sleeve body into the pipeline pipes by engaging and conforming the raised hump to an inner surface of the pipeline pipes as the tubular sleeve body is inserted in the pipeline pipes.

The method may further comprise: during the forming, flexing the central portion of the raised pipeline sleeve; forming the raised pipeline sleeve by positioning a first ring about a second ring; before positioning the first ring about the second ring, applying a flexible layer to the second ring. before positioning the first ring about the second ring, positioning ring spacers at each end of the second ring and applying a flexible layer between the ring spacers; applying a liner to the raised pipeline sleeve and/or the pipeline pipes; forming a seal between the pipeline seal and the liner of the raised pipeline sleeve and/or the pipeline pipes; locking the pipeline seals into sealing engagement with the pipeline pipes and the raised pipeline sleeve by passing a compressible fluid through the pipeline pipes; securing the pipeline pipes together; applying a weld about the first end of the first pipe, the second end of the second pipe, and the raised hump.

In at least one aspect, the disclosure relates to a lockable pipeline seal, comprising: a seal body having a head and a tail, with a body therebetween. In another aspect, the disclosure relates to a pipeline sleeve, comprising: a sleeve body, lockable pipeline seals, and a sleeve lining. In yet another aspect, the disclosure relates to a pipeline connection comprising a pair of pipeline pipes with a pipeline sleeve and lockable pipeline seals therein, the pipeline sleeve extending through adjacent ends of the pair of pipeline pipes. The disclosure also relates to a lockable pipeline seal, a pipeline sleeve, a pipeline connection, and a pipeline; a method of making a pipeline sleeve, a pipeline connection, and/or a pipeline; and method of sealing a pipeline, as described herein.

This Summary is not intended to be limiting and should be read in light of the entire disclosure including text, claims and figures herein.

BRIEF DESCRIPTION OF THE DRAWINGS

So that the above recited features and advantages of the present disclosure can be understood in detail, a more particular description of the disclosure, briefly summarized above, may be had by reference to the embodiments thereof that are illustrated in the appended drawings. The appended drawings illustrate example embodiments and are, therefore, not to be considered limiting of its scope. The figures are not necessarily to scale and certain features, and certain views of the figures may be shown exaggerated in scale or in schematic in the interest of clarity and conciseness.

FIGS. 4A-4B are longitudinal, cross-sectional views of the raised pipeline sleeve in an installed, uninstalled position, respectively.

FIG. 5B is a cross-sectional view of the lockable pipeline seal of FIG. 5A. FIG. 5C is a cross-sectional view of the lockable pipeline seal in both a manufactured and an installed position.

FIGS. 9A-9D are schematic diagrams depicting stages of assembly of the pipeline connection.

FIGS. 11A-11C are end, partial cross-sectional, and cross-sectional views of portions of a raised pipeline sleeve with a slim hump.

FIG. 12A is a cross-sectional view of a portion of a raised pipeline sleeve with a peak raised hump in an uninstalled position. FIGS. 12B and 12C are cross-sectional views of a portion of the pipeline connection with the peak raised pipeline sleeve in an installed and compressed position, respectively, therein.

FIG. 13A is a longitudinal, cross-sectional view of the portion of the pipeline showing the lockable pipeline seal of FIG. 12A in the installed, the uninstalled, and the compressed position.

FIG. 15 is a flow chart a depicting a method of making a sealed pipeline.

DETAILED DESCRIPTION

Figure 1:
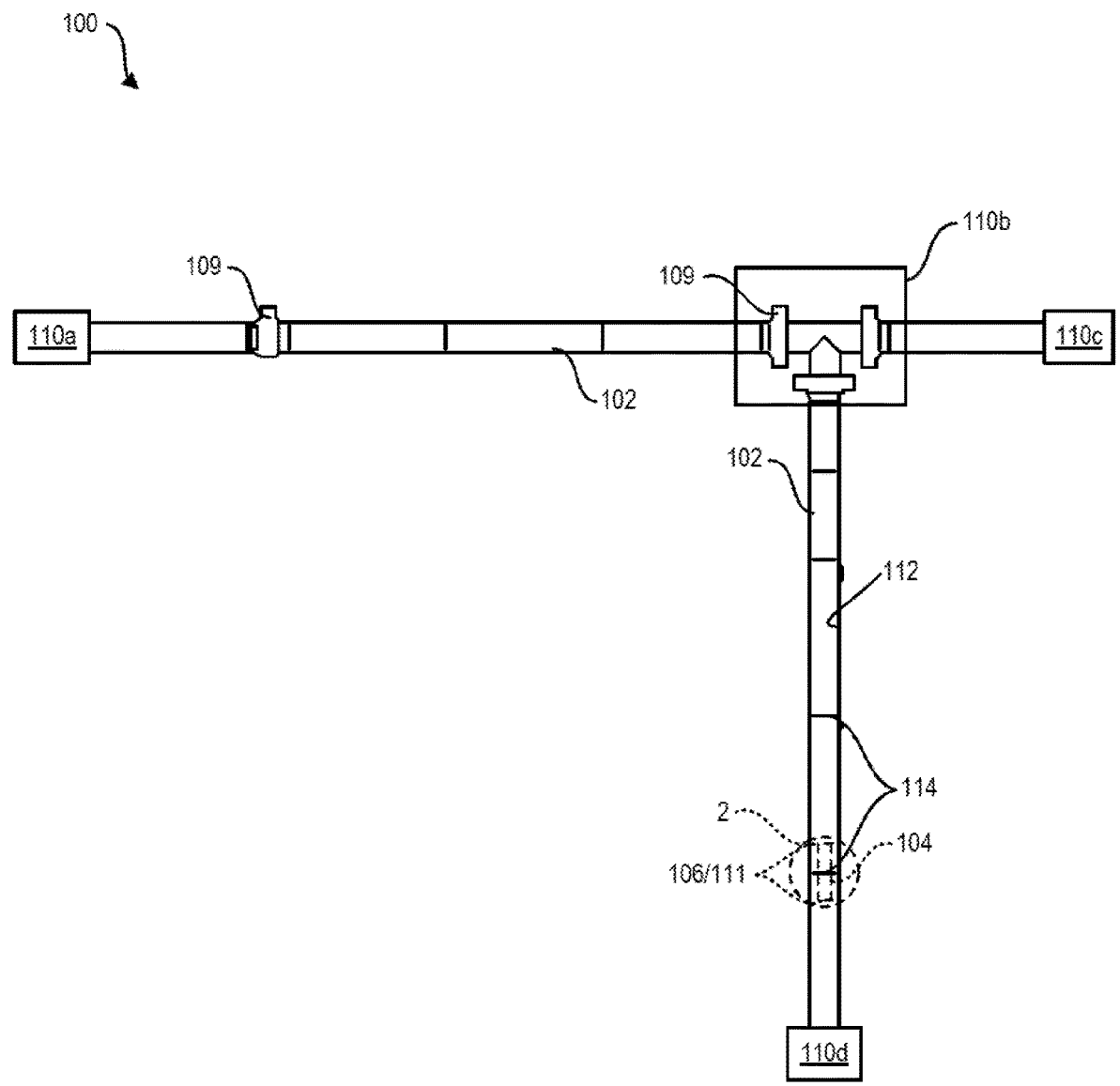
FIG. 1 is a schematic diagram depicting a pipeline comprising pipeline pipes and raised pipeline sleeves with raised pipeline connections therebetween.

The description that follows includes exemplary apparatus, methods, techniques, and/or instruction sequences that embody techniques of the present subject matter. However, it is understood that the described embodiments may be practiced without these specific details.

The present disclosure relates to a pipeline with one or more sealed pipeline connections. The sealed pipeline connection comprises an adjacent pair of pipeline pipes, a raised pipeline sleeve, and pipeline seals. The raised pipeline sleeve is positioned within the adjacent pair of the pipeline pipes. The raised pipeline sleeve has a raised hump on its outer surface for sealing engagement with an inner surface of the pipeline pipes for forming a hump seal therebetween. Pipeline seals (e.g., lockable pipeline seals) may be positioned on opposite ends of the raised pipeline sleeve to form a sleeve seal (e.g., contact, grip, installation, deflection, lock seal, etc.) with the pipeline pipes when in contact therewith.

The raised hump of the raised pipeline sleeve may be used to position (e.g., center, offset, etc.) the raised pipeline sleeve within the pipeline pipes, and/or to accommodate pipeline pipes of various shapes (e.g., out of round conditions, oval, round, etc.), deformities, and tolerances. The raised hump may have various configurations (e.g., centered, offset, wide, narrow, peak, etc.) to provide for positioning of the raised pipeline sleeve about the pipeline pipes. For example, portions of the raised pipeline sleeve adjacent to the raised hump may be recessed to facilitate insertion of the raised pipeline sleeve into the pipeline pipes, and the raised hump may act as a stop to limit (e.g., slow, terminate) advancement of the pipeline pipes along the raised pipeline sleeve. The raised hump may also be used to bridge a weld space between the pipeline pipes when the pipeline pipes are abutted together, and to eliminate a requirement for radial spacer inserts between the abutted pipeline pipes. The raised hump and/or the lockable pipeline seals may also facilitate sealing of the raised pipeline sleeve with the pipeline pipes to prevent passage of fluid between the pipeline sleeve and the pipeline pipes.

The raised hump and/or the raised pipeline sleeve may change shape and/or dimension by compressing, flexing, deforming, deflecting, gripping, flowing, molding, and/or otherwise shifting as needed to engage the pipeline pipes and/or to fill spaces, and/or to form the hump seal about the pipeline connection. This raised pipeline sleeve may be shaped, for example, to allow for looser tolerances between the pipeline pipes and the raised pipeline sleeve, to provide an interference fit for assembly, to center the raised pipeline sleeve within the pipeline pipes, and/or to allow the raised pipeline sleeve to act as a gasket to provide positive sealing between the raised pipeline sleeve and the pipeline pipes.

The raised pipeline sleeve may be formed of various materials and/or shapes to allow the raised pipeline sleeve to be energized, to fill the spaces, and/or to apply a compressive force to assure secure sealing about the pipeline pipes. The raised pipeline sleeves may also have features, such as the raised hump, a flexible layer, rings, rims, etc. to facilitate assembly and/or to assure proper sealing. For example, the raised pipeline sleeve may have concentric rings with a flexible layer to allow the raised pipeline sleeve and/or the raised hump to mold about and align with the pipeline pipes during installation and use. In another example, the raised pipeline seals may have redundant sealing surfaces (e.g., primary and secondary sealing surfaces) to assure tight sealing along the pipeline pipe.

The pipeline and one or more of its components (e.g., the sealed pipeline connection, the raised pipeline sleeve, the pipeline seals, etc.) may also be provided with one or more of the following capabilities, among others: ease of manufacture, ease of assembly, efficient operation, lower assembly cost, cost effective assembly and/or use, reinforced sealing, and operability with existing systems and/or equipment, dimensions that can be tailored to fit various configurations, prevention of leakage and/or corrosion, adjustability for various tolerances, shaped to mold to and/or sealingly engage surfaces of the pipeline (e.g., the pipeline pipes, the raised pipeline sleeve), etc.

FIG. 1 is a schematic diagram depicting the pipeline 100 comprising the pipeline pipes 102 and the raised pipeline sleeves 104 with raised pipeline connections 114 therebetween. This figure shows an example of a pipeline system including facilities 110a-d with the pipeline pipes 102 extending therebetween. In the example shown, the facilities 110a-d include a production facility 110a, a beneficiation facility 110b, a market 110c, and a tailings disposal 110d. The pipeline pipes 102 extend from the production facility 110a, through the beneficiation facility 110b, and to the market 110c.

A portion of the pipeline 100 branches off at the beneficiation facility 110b and extends to the tailings disposal 110d. Supports 109 may optionally be provided along the pipeline 100 to support the pipeline pipes 102. A passage 112 extends through each of the pipeline pipes 102 to define a pathway for the passage of fluids (e.g., oil, gas, water, etc.) between the facilities 110a-d.

The pipeline 100 includes a series of the pipeline pipes 102 connected together end to end in series to form the pipeline 100. A pipeline connection 114 is formed between each adjacent pair of the pipeline pipes 102. The adjacent pair of the pipeline pipes 102 may be joined by various means capable of securing the pipes together. The pipeline connection 114 may be formed, for example, by attaching a connector (such as an external joint or an internal sleeve) across adjacent pair of the pipeline pipes 102, by applying a weld to ends of adjacent pairs of the pipeline pipes 102, and/or by threading ends of the adjacent pairs of the pipeline pipes 102 together. Examples of techniques for connecting pipes or other tubulars are described in the patent/application(s) previously incorporated by reference herein.

The pipeline pipes 102 may be provided with various connectors, such as the raised pipeline sleeves 104, therein. The raised pipeline sleeve 104 may be positioned along the pipeline connection 114 between the adjacent pairs of the pipeline pipes 102. The raised pipeline sleeve 104 is sealingly positioned within the adjacent pair of the pipeline pipes 102. In this example, the raised pipeline sleeve 104 may be a tubular member (with a tubular body) insertable into the ends of adjacent pairs of the pipeline pipes 102.

The raised pipeline sleeves 104 may be provided with the lockable pipeline seals 106 to form a pipeline seal 111 about the pipeline connection 114 and/or between the raised pipeline sleeve 104 (and or its portions) and one or more of the pipeline pipes 102 as described further herein. The pipeline 100, the pipeline pipes 102, and/or the raised pipeline sleeves 104 may be provided with various features to facilitate forming the pipeline connection 114 and/or the seals as described further herein.

The pipeline 100 may be a continuous, monolithic piping system or include individual, connected sections of the pipeline pipes 102. It will be appreciated that different configurations of the pipeline 100 and its components may be used. While several examples of configurations that may be used are described, these are not intended to be limiting of the features of the disclosed pipeline connection 114 and the raised pipeline sleeves 104 described herein.

Figure 2:
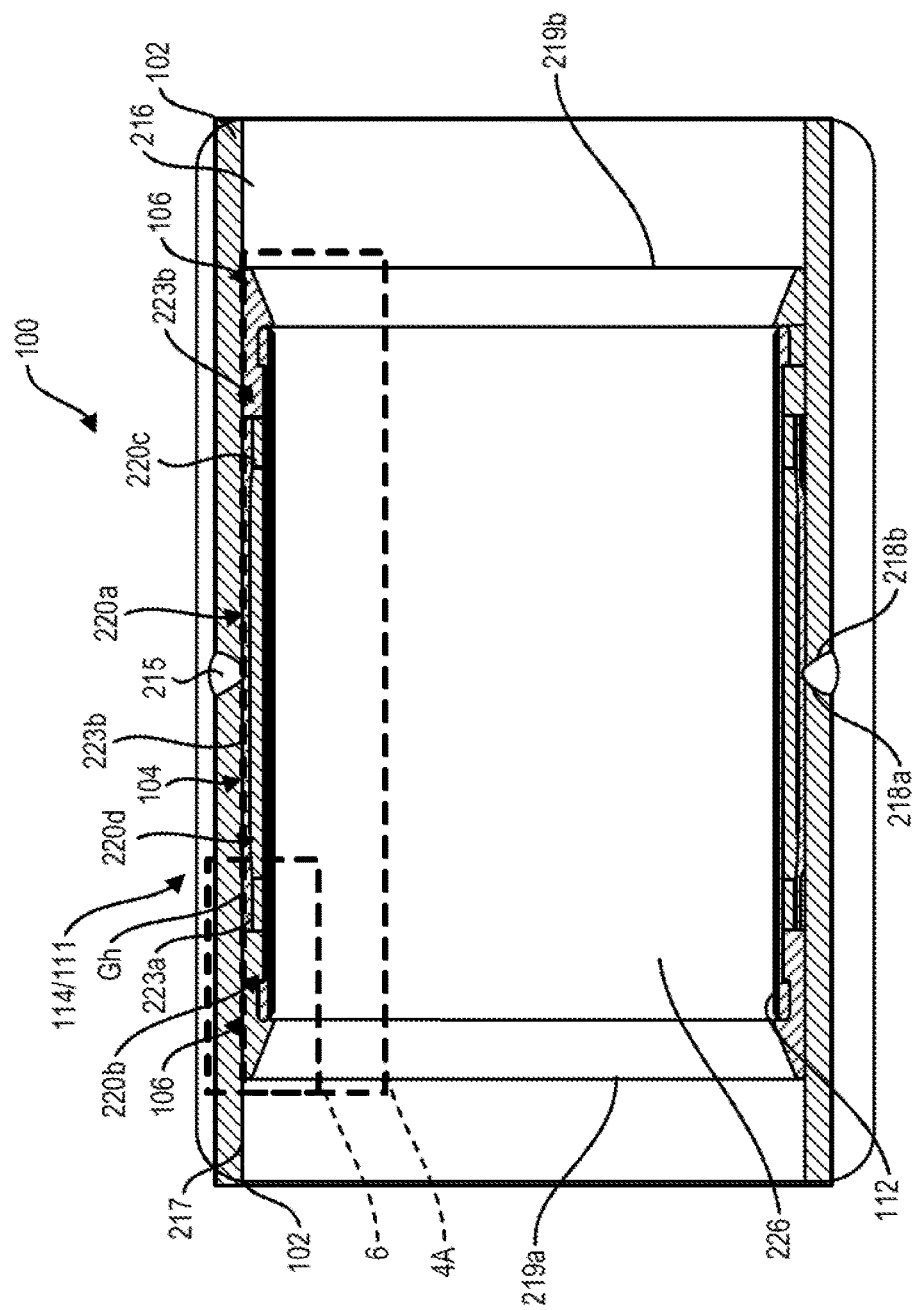
FIG. 2 is a longitudinal, cross-sectional view of a portion 2 of the pipeline of FIG. 1.
Figure 3:
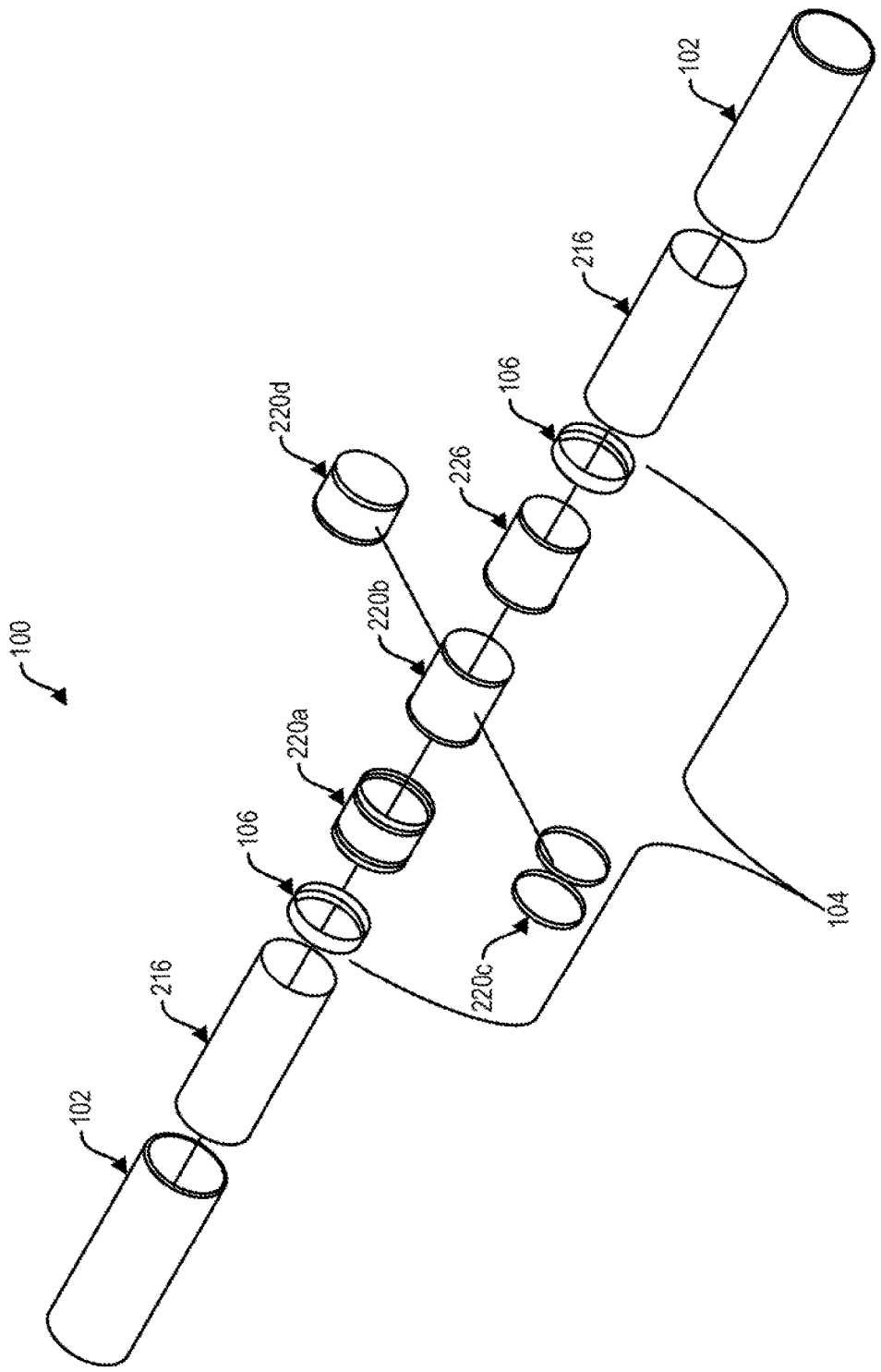
FIG. 3 is an exploded view of the raised pipeline connection.

FIGS. 2 and 3 show various views of a portion of the pipeline 100 depicting the pipeline connection 114 and the pipeline sleeve 104 in greater detail. FIG. 2 is a longitudinal, cross-sectional view depicting a portion 2 of the pipeline 100 of FIG. 1. FIG. 3 is an exploded view of the portion 2 of the pipeline 100 of FIG. 2. As shown in these figures, the pipeline 100 has the pipeline connection 114 formed by the pairs of pipeline pipes 102 and the raised pipeline sleeve 104. The pair of pipeline pipes 102 are joined end to end with the raised pipeline sleeve 104 therein to form the pipeline connection 114 therebetween.

The pipeline pipes 102 are metal tubulars having the passage 112 therethrough. Each of the pipeline pipes 102 are shown as having first and second pipeline ends 218a,b positioned adjacent to each other. Each of the pipeline pipes 102 has the first pipeline end 218a and the second pipeline end 218b at each end thereof. In the example shown the first and second pipeline ends 218a,b are beveled.

When axially aligned for mating, the first pipeline end 218a of one of the pipeline pipes 102 is connected to the second pipeline end 218b of another of the pipeline pipes 102. The pipeline ends 218a,b are joined by a connection means 215 therebetween. In this example, the pipeline ends 218a,b of each of the pair of pipeline pipes 102 are in abutting engagement with the connection means 215 in the form of a full penetration weld for securing the abutting pipeline ends 218a,b together. While the pipeline pipes 102 are shown in abutting engagement, the pipeline pipes 102 may optionally be connected using butt strap or other methods, such as where the ends 218a,b of the pipeline pipes 102 overlap and are secured together by welding or other means.

The pipeline pipes 102 have a pipe lining 216 along their inner surface 217. The pipe lining 216 may be positioned inside each of the pipeline pipes 102 for protection thereof. The pipe lining 216 may be made of a wear resistant material, such as a liquid epoxy, fusion bonded epoxy, polyurethane, or any other material that provides a protective layer. This material may be applied (e.g., sprayed) to the pipeline pipes 102 to form a protective layer thereon.

The pipe lining 216 may be a thin layer (e.g., substantially thinner than a thickness of the pipeline pipes 102). The pipe lining 216 may extend over only a portion of the inner surface 217 of the pipeline pipes 102. A remaining portion of the inner surface 217 near the pipeline ends 218a,b may have no pipe lining 216 to allow portions of the raised pipeline sleeve 104 to engage the inner surface 217 of the pipeline pipe 102. Examples of techniques for lining pipes are described in the patent/applications incorporated by reference herein.

The raised pipeline sleeve 104 is positioned in the pipeline pipes 102. The raised pipeline sleeve 104 includes an outer ring 220a, an inner ring 220b, ring spacers 220c, a flex layer 220d, and the pipeline seals 106. The inner ring 220b may have a sleeve lining 226 thereon. The raised pipeline sleeve 104 may be a tubular member axially aligned with the pipeline pipes 102 and concentrically positioned therein. The raised pipeline sleeve 104 is positioned along the inner surface 217 of the pipeline pipes 102. The raised pipeline sleeve 104 may be shaped to fit snugly within the pipeline pipes 102 to form the pipeline seal 111 thereabout. The passage 112 extends through the pipeline pipes 102 and the raised pipeline sleeve 104 to permit substantially uninterrupted flow of fluid therethrough.

The raised pipeline sleeve 104 has a first sleeve end 219a that extends into the first pipeline end 218a and a second sleeve end 219b that extends into the second pipeline end 218b of the pair of pipeline pipes 102 such that the raised pipeline sleeve 104 extends across both pipeline pipes 102 to form the pipeline connection 114. The raised pipeline sleeve 104 may be partially or fully pre-assembled for insertion into and/or use with the pipeline pipes 102 as described further herein.

When the raised pipeline sleeve 104 is inserted into the pipeline pipes 102, the outer ring 220a is positionable along the inner surface 217 of the pipeline pipes 102. The outer ring 220a is insertable into the pipeline pipes 102 and extends across the first and second ends 218a,b of the pipeline pipes 102. Once the raised pipeline sleeve 104 is installed in the pipeline pipes 102 and the pipeline connection 114 is formed, the raised pipeline sleeve 104 may be urged into sealing engagement with the adjacent pipeline pipes 102 to form the pipeline seal 111 therein as is described further herein. The raised pipeline sleeve 104 may be provided with a raised hump 223b to facilitating the pipeline seal and/or to facilitate positioning about the pipeline pipes 102 as is also further described herein.

4A and 4B show the raised pipeline sleeve 104 in greater detail. FIGS. 4A and 4B are cross-sectional views of the raised pipeline sleeve 104 in an installed and uninstalled position, respectively. FIG. 4A shows a portion 4A of the raised pipeline sleeve 104 of FIG. 2 after installation in the pipeline pipes 102. FIG. 4B shows the raised pipeline sleeve 104 prior to insertion into the pipeline pipes 102. For descriptive purposes and for comparison with the raised pipeline sleeve of FIG. 4B, the pipeline pipes 102 have been removed from FIG. 4A.

The outer ring 220a may be a thin, metal member having outer ends 223a with a raised hump 223b defined therebetween. The outer ends 223a may be substantially flat for engagement with the ring spacers 220c. In the uninstalled position of FIG. 4B, the raised hump 223b may be substantially flat with tapered ends that extend down at an angle down to meet a corresponding one of the substantially flat outer ends 223a.

Referring back to FIG. 2, the outer ends 223a may remain a distance from the inner surface 217 with a hump gap $G_h$ defined between the outer ends 223a and the inner surface 217 of the pipeline pipes 102. The size and shape of the hump gap Gh is defined by the shape of the raised hump 223b and the outer ends 223a, and may change as the raised hump 223b is deformed against the flex layer 220d as is described further herein. The raised hump 223b may be flattened until the gap Gh is eliminated. Depending on the shape of the pipeline pipes 102, part or all of the raised hump 223b may remain at least partially raised, and/or all or part of the outer ends 223a may be remain fully or party in non-contact with the pipeline pipes 102.

Referring to FIGS. 2 and 4B, the raised hump 223b may have a width (Wh) wide enough to engage both pipeline pipes 102 when the raised pipeline sleeve 102 is inserted into the pipeline pipes 102. The raised hump 223b may act as a bridge to join a pipe space that may remain between the pipeline pipes 102 when the pipeline pipes 102 are moved to an abutted position adjacent to each other. When the raised pipeline sleeve 104 is installed into the pipeline pipes, The raised hump 223b may form the bridge between the adjacent ends of the pipeline pipes, and/or between the pipeline sleeve and each of the pipeline pipes. The raised hump 223b may also act as a support for the pipeline pipes 102 and connections (e.g., weld 215) applied thereto when the pipeline pipes 102 are secured together.

The outer ring 220a may be flexible so that, when advanced into the pipeline pipe 102, the outer ring 220a may deform to conform to the inner surface 217 of the pipeline pipes 102 as shown by the dashed lines in FIG. 4B and as shown by the flattened raised hump 223b' of FIG. 4A. As shown in FIG. 4B, the raised hump 223b may move from a raised position of to a flattened position (indicated by the dashed lines) to fit within the pipeline pipes 102 as is described further herein. The raised hump 223b may partially or fully flatten as needed.

The movement of the raised hump 223b during installation of the raised pipeline sleeve 104 into the pipeline pipes 102 may also shift the raised pipeline sleeve 104 to fit within the pipeline pipes 102. Initially, the outer ends 223a of the raised pipeline sleeve 104 adjacent to the raised hump 223b (e.g., about the gap Gh) have a smaller diameter than the raised pipeline sleeve 104, thereby facilitating insertion of the end of the raised pipeline sleeve 104 into the pipeline pipes 102. The raised hump 223b may act as a stop to the advancement of the raised pipeline sleeve 104 into the pipeline pipes 102 until the raised hump 223b shifts to fit within the pipeline pipes 102. The flexibility of the raised pipeline sleeve 104 and the raised hump 223b may allow the raised pipeline sleeve 104 and the raised hump 223b to shift to conform to the pipeline pipes 102 as the raised pipeline sleeve advances further into the pipeline pipes 102.

The shifting and/or flexibility of the raised pipeline sleeve 104 may allow the raised pipeline sleeve 104 to adapt to various shapes and sizes of the pipeline pipes 102, and/or to work in a wider range of tolerances, such as out of round conditions and variations in dimensions in the pipeline pipes 102. As the raised hump 223b engages the inner surface 217 of the pipeline pipes 102, the raised hump 223b may cause the raised pipeline sleeve 104 to center concentrically within the pipeline pipes 102, and/or to conform with any imperfections in the pipeline pipes 102.

The inner ring 220b may also be a thin, metal member. The inner ring 220b is concentrically positioned within the outer ring 220a. The inner ring 220b has a tubular shape with a flat inner surface 221a, a flat outer surface 221b, and raised rims 221c. The rims 221c may be positioned along the outer surface 221b or may be formed integrally therewith. The rims 221c are positioned at opposite ends of the inner ring 220b along the outer surface 221b.

The sleeve lining 226 is positioned along the inner surface 221a of the inner ring 220b. The sleeve lining 226 may be a protective material similar to the pipe lining 216, and may be capable of protecting the raised pipeline sleeve 104. The sleeve lining 226 may extend around each end of the inner ring 220b to cover a portion of the outer surface 221b of the inner ring 220b and may extend over the rims 221c.

The ring spacers 220c and the flex layer 220d are positioned between the outer ring 220a and the inner ring 220b. The ring spacers 220c are flat ring-shaped members positioned at each of the outer ends 223a,b of the outer ring 220a. The ring spacers 220c may be positioned flush (or in alignment with) the flat outer ends 223a of the outer ring 220a. The ring spacers 220c are also positioned between opposite ends of the inner ring 220b a distance from each of the raised rims 221c. A recess 227 is defined between the ring spacers 220c and the raised rims 221c.

The ring spacers 220c are positioned between the outer ring 220a and the inner ring 220b to define a flex cavity 229 between the outer ring 220a, the inner ring 220b, and the ring spacers 220c. The flex cavity 229 is shaped to receive the flex layer 220d therein. The flex cavity 229 may have a flat inner surface adjacent to the inner ring 220b, flat side surfaces adjacent the ring spacers 220c, and a raised outer surface adjacent to the outer ring 220a.

The flex layer 220d may partially or fully fill the flex cavity 229. The flex layer 220d may be a flexible, uncompressible material, such as rubber, silicone, fiberglass, cellulose, ceramic, ceramic fiber, fiber, and/or other elastic and/or insulative material, capable of supporting the outer ring 220a and the inner ring 220b. The insulative material may also provide heat protecting properties to protect the raised pipeline sleeve 104 during operations, such as welding.

When the raised pipeline sleeve 104 is inserted into the pipeline pipes 102 and the outer ring 220a deforms within the pipeline pipes 102 (FIG. 2), the flex layer 220d may flex to accommodate the movement of the outer ring 220a. The outer ring 220a may compress against the flexible layer 220d and press the flex layer 220d against the inner ring 220b. The flex layer 220d and the outer ring 220a may apply a force against the pipeline pipes 102. This force may further enhance positioning and/or sealing between the raised pipeline sleeve 104 and the pipeline pipes 102.

The outer ring 220a and the flex layer 220d may be flexible for facilitating insertion of the raised pipeline sleeve 104 into the pipeline pipes 102. The outer ring 220a and the flex layer 220d may be also be flexible for facilitating formation of the pipeline seal 111 (FIG. 2). Upon insertion into the pipeline pipes, the raised hump 223b of the outer ring 220a may be shifted towards the inner ring 220b as the outer ring 220a engages the inner surface 217 of the pipeline pipes. The flex layer 220d may also deform to allow the raised hump 223b to flatten out and conform to the shape of the pipeline pipes 102.

As the raised hump 223b flattens, a thickness Ts1 of the raised pipeline sleeve 104 reduces to a thickness Ts1', and a thickness Tf of the flex layer 220d reduces to a thickness Tf'. The raised hump 223b may flatten to align with the outer ends 223a, or may remain at least partially raised a distance above the outer ends 223a. Part or all of the raised hump 223b may deform to conform to the shape of the pipeline pipes 102 which may or may not be consistent about the pipeline connection 114.

In another example, the raised pipeline sleeve 104 may be an unraised (or flat) pipeline sleeve with no raised hump on the outer ring 220a. In such case, the outer ring 220a may remain flat in both the uninstalled position and in the installed position as shown in FIG. 4A. When in the unraised position, the outer ring 220a and the flex layer 220d may continue to deform and/or flex when installed the unraised pipeline sleeve is installed in the pipeline pipes 102. The inner ring 220b extends a distance beyond the ring spacers 220c and the outer ends 223a of the outer ring 220a to define a sleeve step 225 therebetween. The step 225 is positioned adjacent to the recess 227. The step 225 and the recess 227 are shaped to receive and support the lockable pipeline seals 106. The lockable pipeline seals 106 are positioned adjacent to the sleeve step 225 at about each end of the inner ring 220b adjacent to the ring spacers 220c. The step 225 and the recess 227 also support the lockable pipeline seals 106 after installation as they are engaged to form a seal with the pipeline pipes 102 and the pipeline connection 114 as is described further herein.

When the raised pipeline sleeve 104 is positioned in the pipeline pipes 102, the lockable pipeline seals 106 are positioned adjacent the inner surface 217 of the pipeline pipes 102 (FIG. 2). The lockable pipeline seals 106 may be positioned on each of the first sleeve end 219a and the second sleeve end 219b of the raised pipeline sleeve 104 and inserted into the pipeline pipes 102 with the raised pipeline sleeve 104 for sealing engagement with the pipes 102 and/or the pipe lining 216 therein.

In the examples shown, the lockable pipeline seals 106 are positioned about the pipeline sleeve 104 for sealing engagement with the pipeline pipes 102. It will be appreciated that any seal (lockable or unlockable) positionable about the raised pipeline sleeve 104 and sealable between the pipeline sleeve 104 and each of the pipeline pipes 102 may be used. The lockable pipeline seals 106 may be made of various materials, such as an extruded or a moldable material capable of sealing with the pipeline pipes 102 and the raised pipeline sleeve 104. The moldable material may be, for example, metal plates with o-rings or gaskets, flexible metal (e.g., thin gauge steel), an elastomeric material (e.g., fluorocarbon rubber (FKM), silicone rubber or nitrile rubber (NBR)), a moldable material (e.g., neoprene), and combinations thereof. In one example, the moldable material is ethylene propylene diene monomer (EPDM), with a 60+/−5 Shore A hardness or chloroprene (neoprene) 60+/−5 Shore A hardness. The lockable pipeline seals 106 may be included as a component of the raised pipeline sleeve 104 or assembled separately therefrom.

As shown in the example of FIG. 2, the lockable pipeline seals 106 have a shape defined to form the sleeve seal with the pipeline pipes 102 and the raised pipeline sleeve 104 (as well as the pipe lining 216 and the sleeve lining 226). Portions of the lockable pipeline seal 106 may engage and form contact, deflection, compressed, and/or locked seals with portions of the pipeline pipes 102 and the raised pipeline sleeve 104 to prevent fluid leakage therebetween as the lockable pipeline seal 106 is in the uninstalled, installed, and/or locked positions as is also described further herein. Further details about the lockable pipeline seal 106 may be found in U.S. Provisional Application No. 63/061,786, previously incorporated by reference herein.

As shown in FIG. 4B, the raised pipeline sleeve 104 and its various components may have various shapes and dimensions for operation with the pipeline pipes 102 and for forming the pipeline seal 111. Table 1 below sets forth example dimensions for portions of the raised pipeline sleeve 104.

TABLE 1

UNINSTALLED AND INSTALLED DIMENSIONS OF THE RAISED HUMP

| DIMENSION | COMPONENT | MEASUREMENT |
| --- | --- | --- |
| Wor | OUTER RING 220A WIDTH | 106 mm - 127 mm |
| Wh | RAISED HUMP 223B WIDTH | 9.53 mm - 76.2 mm |
| We | OUTER ENDS 223A WIDTH | 12.7 mm - 19.05 mm |
| Wir | INNER RING 220B WIDTH | 171.45 mm - 180 mm |
| Wr | RIMS 221C WIDTH | 9.53 mm- 12.7 mm |
| Wrr | RECESS 227 WIDTH | 12.7 mm - 19.05 mm |
| Ws | RING SPACERS 220C WIDTH | 2 mm - 12.7 mm |
| Wi | FLEX LAYER 220D WIDTH | 101.6 mm - 123 mm |
| Tor | OUTER RING 220A THICKNESS | 1.5 mm - 2.0 mm |
| Tir | INNER RING 220B THICKNESS | 1.5 mm - 2 mm |
| Ts | SPACER 220C THICKNESS | 3,2 mm - 4.0 mm |
| Tf, Tf' | FLEX LAYER 220D THICKNESS | 4.2 mm - 5.0mm |
| Tr | RIM 221C THICKNESS | 3 mm - 4 mm |
| Tsl, Tsl' | RAISED PIPELINE SLEEVE 104 THICKNESS | 7.2 mm -7.7 mm |

While this disclosure describes specific structures of the pipeline pipes 102, the pipeline connection 114, the raised (or unraised) pipeline sleeve 104, the lockable pipeline seals 106 and other features described herein, it will be appreciated that the features of these components may vary. For example, the shape and dimensions of the raised pipeline sleeve 104, the raised hump 223b, and the lockable pipeline seal 106 may vary. In another example, the raised pipeline sleeve 104 may be positioned in any configuration capable of extending the pipeline seal 111 across the pair of adjacent pipeline pipes 102, such as in an external configuration where the raised pipeline sleeve 104 is positioned along an outer surface of the pipeline pipes 102 with the lockable pipeline seals 106 positioned between the raised pipeline sleeve 104 and an outer surface of the pipeline pipes 102. Examples of other variations and features that may be used are described in PCT Patent No. PCT/BR2018/050315, previously incorporated by reference herein.

Figure 5A:
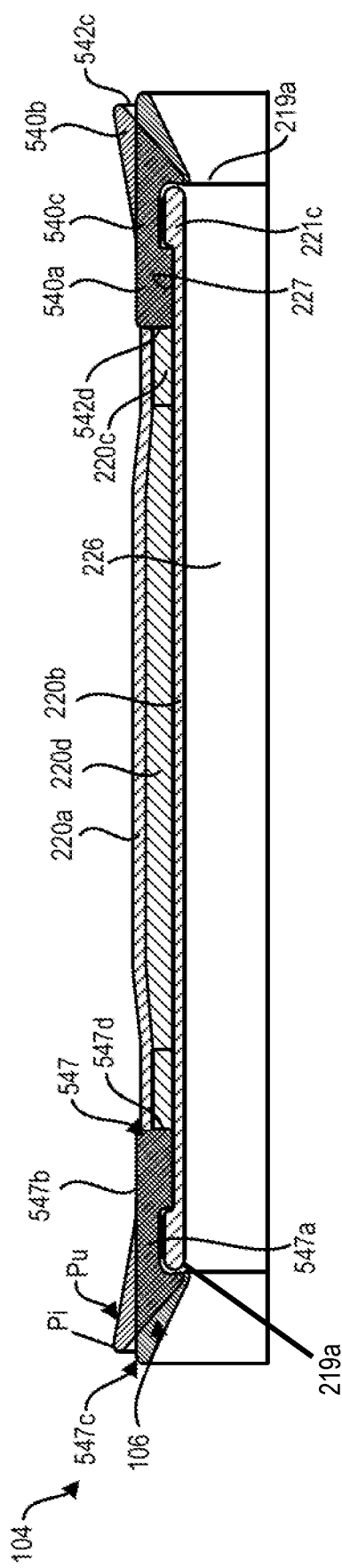
FIG. 5A is a longitudinal, cross-sectional view of the raised pipeline sleeve with a lockable pipeline seal in both an installed and uninstalled position.

FIGS. 5A-5C, 6A-6B, and 7A-7C show the lockable pipeline seal 106 in greater detail. These figures also show the lockable pipeline seal 106 as it changes shape during use. Referring first to FIGS. 5A-5C, FIG. 5A is a longitudinal, cross-sectional view of the raised pipeline sleeve 104 with a lockable pipeline seal 106 in an installed and uninstalled position. For descriptive purposes, the pipeline pipes 102 are not shown in FIG. 5A. FIG. 5B is a cross-sectional view of the lockable pipeline seal 106 of FIG. 5A. FIG. 5C is a cross-sectional view of the lockable pipeline seal 106 in both a manufactured and an installed position. For descriptive purposes, the lockable pipeline seal 106 of FIGS. 5B and 5C is shown without the pipeline pipes 102 or portions of the raised pipeline sleeve 104.

As shown in FIGS. 2 and 5A, the lockable pipeline seals 106 are positioned about the sleeve ends 219a,b on the rims 221c of the inner ring 220b. The lockable pipeline seal 106 has a rounded head 540a at one end, a tapered tail 540b at another end, and an elongate body 540c therebetween. The lockable pipeline seal 106 has a head end 542c at an end of the head 540a and a tail end 542d at the end of the tail 540b. The lockable pipeline seal 106 also has a peripheral surface 547 including an inner surface 547a on one side and an outer surface 547b on an opposite side. The peripheral surface 547 also includes a tail surface 547c about the tail end 542d and a head surface 547d about the head end 542c. A pocket (grip) 545 is defined along the inner surface 547a between the head 540a and the tail 540b.

The head 540a is positioned in the recess 227 adjacent the rim 221c, the spacer 220c, and the outer ring 220a of the raised pipeline sleeve 104. The tail 540b extends a distance from the sleeve end 219a of the raised pipeline sleeve 104. The lockable pipeline seal 106 is positionable on the rims 221c which retain the lockable pipeline seals 106 in place. The pocket 545 is shaped to grippingly receive the rim 221c. The head 540a may be pinched between the rim 221c and the spacer 220c (and the outer ring 220a). Other versions may have the head 540a a distance from the spacer 220c (and the outer ring 220a).

FIGS. 5A-5C also show the lockable pipeline seal 106 as it moves between a manufactured (e.g., extruded, molded, etc.) position Pe, the uninstalled position Pu, and the installed position Pi during use. Before installation, the lockable pipeline seal 106 is in a manufactured (extruded) position Pe. As schematically shown in FIGS. 5A and 5B, the lockable pipeline seal 106 moves between the uninstalled position Pu when the lockable pipeline seal 106 is mounted onto the inner ring 220b, to the installed position Pi when the raised pipeline sleeve 104 is installed into the pipeline pipes 102.

As shown by these figures, the head 540a remains in substantially the same position, and the tail 540b of the lockable pipeline seal 106 rotates from a raised position to a flat position about the tail 540b. When installed, the tail 540b rotates about the end of the rim 221c. A deflection portion 549 of the outer surface 547b is raised at an angle to a horizontal axis H of the lockable pipeline seal 106. The deflection portion 549 of the outer surface 547*b* of the lockable pipeline seal 106 shifts from an angled position to a flat position parallel to the horizontal axis H and conforming to the pipeline pipes 102 as it engages the inner surface 217 of the pipeline pipes. In the flat position, the outer surface 547*b* is positioned against the flat inner surface 217 of the pipeline pipes 102, and may apply a sealing force against the pipeline pipes 102 (see, e.g., FIG. 2).

As schematically shown in FIG. 5C, prior to placement of the lockable pipeline seal 106 onto the rim 221*c* of the raised pipeline sleeve 104, the lockable pipeline seal 106 is in the manufactured position Pe. In the manufactured position Pe, the lockable pipeline seal 106 is in its original shape as formed. Such manufacture may involve, for example, extrusion of rubber to form the lockable pipeline seal 106. The lockable pipeline seal 106 may move from the manufactured position Pe to the uninstalled position Pu when placed onto the raised pipeline sleeve 104. In cases where the lockable pipeline seal 106 is manufactured by molding, the manufactured position Pe may be substantially the same as the uninstalled position Pu.

As also shown in FIG. 5C, the tail 540*b* is rotated from a flat configuration when in the manufactured position Pe to a tilted configuration when shifted to the uninstalled position Pu. The tail 540*b* rotates about the head 540*a* when the lockable pipeline seal 106 is positioned on the rim 221*c* of the raised pipeline sleeve 104. During the rotation of the tail 540*b*, the pocket 545 is raised as the lockable pipeline seal 106 is mounted onto the rim 221*c*, and the outer surface 547*b* moves from the flat to the angled position.

Figure 6A:
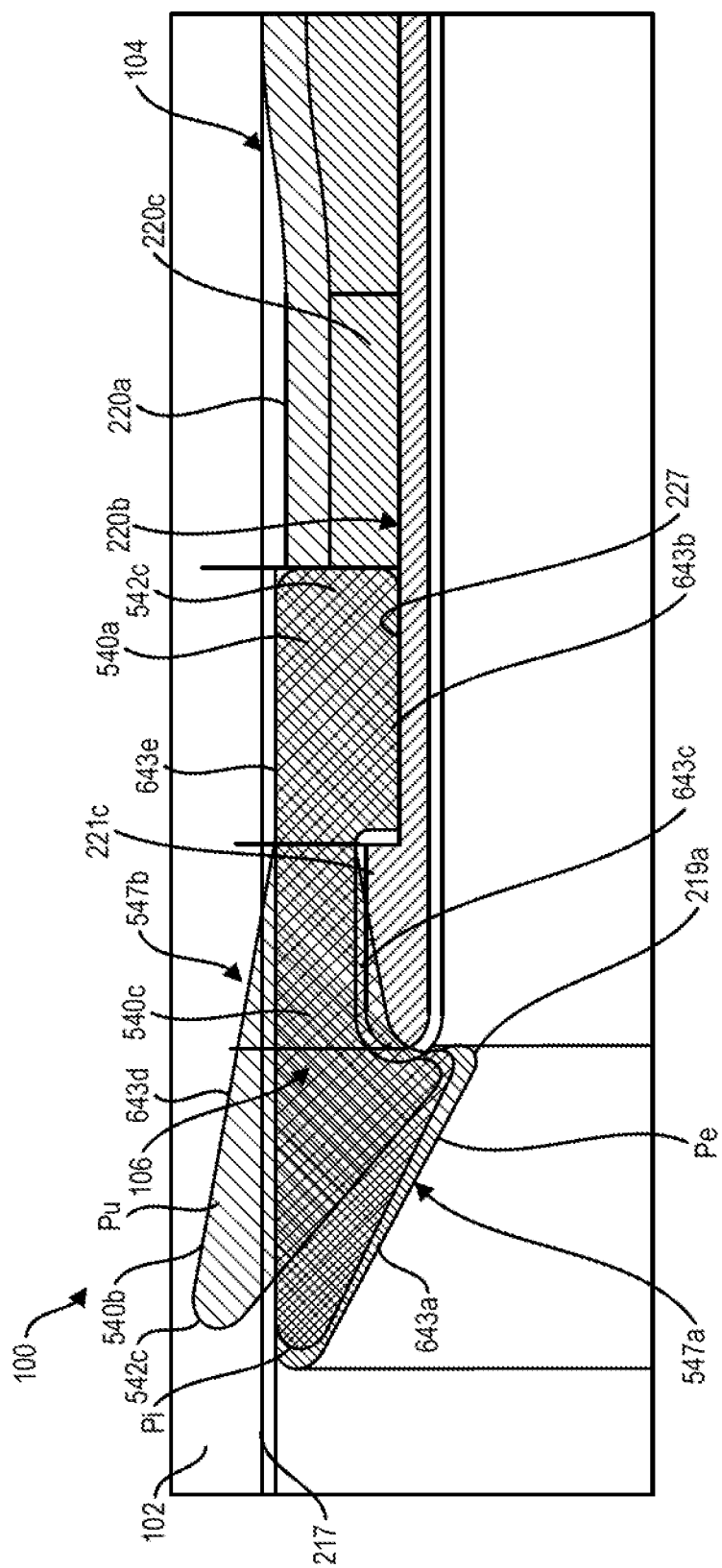
FIG. 6A is a longitudinal, cross-sectional view of a portion 6 of the pipeline of FIG. 2 showing the lockable pipeline seal in the installed, the uninstalled, and the manufactured position.
Figure 6B:
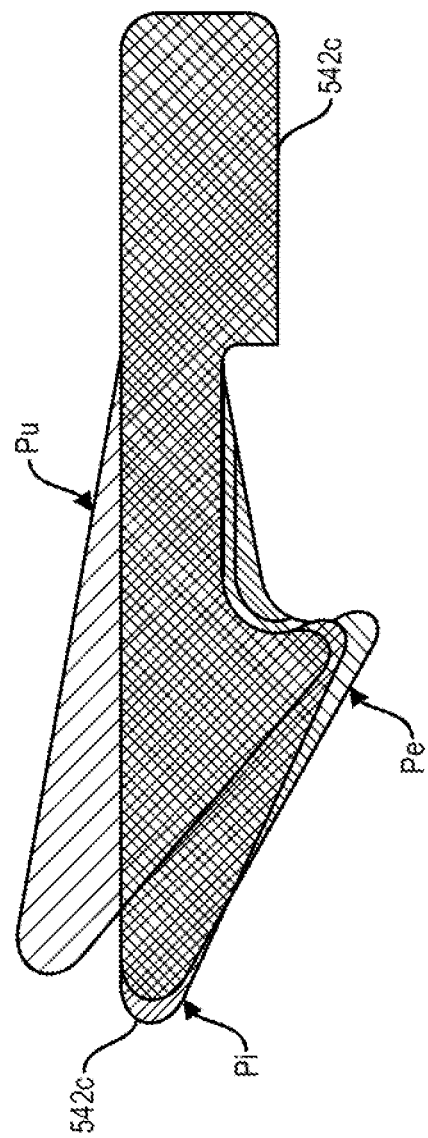
FIG. 6B is a cross-sectional view of the lockable pipeline seal of FIG. 6A.

FIGS. 6A and 6B show another view of the movement of the lockable pipeline seal 106 during use. FIG. 6A is a longitudinal, cross-sectional view of a portion 6 of the pipeline 100 of FIG. 2 showing the lockable pipeline seal 106 in the installed, the uninstalled, and the manufactured position. FIG. 6B is a cross-sectional view of the lockable pipeline seal 106 of FIG. 6A. For comparison, these figures overlay the images of the lockable pipeline seal 106 in the manufactured position Pe, the uninstalled position Pu, and the installed position Pi. For descriptive purposes, the lockable pipeline seal 106 is shown in FIG. 6B without the pipeline sleeve 104 and the pipeline pipes 102.

As shown in FIG. 6A, the lockable pipeline seal 106 grippingly and/or sealing engages portions of the raised pipeline sleeve 104 and the pipeline pipes 102. The inner surface 547*a* of the lockable pipeline seal 106 comprises a non-contact surface 643*a* along the tail 540*b*, a recess surface 643*b* along the head 540*a*, and a gripping surface 643*c* therebetween. The outer surface 547*b* comprises the deflection surface 643*d* and a flat surface 643*e*. In the uninstalled position, the surfaces 643*b*,*c* may contact portions of the raised pipeline sleeve 104 to form a contact seal therewith. In the installed position, the surfaces 643*d*,*e* may be defined to engage the inner surface 217 of the pipeline pipes 102 to form at least a portion of the pipeline seal 111. The gripping surface 643*c* may be shaped to receivingly grip the rim 221*c*. The shape of the gripping surface 643*c* may be defined such that the gripping surface 643*c* tightly grips the rim 221*c* and applies a force to the rim 221*c* to create a stronger seal.

As further shown in FIGS. 6A and 6B, the lockable pipeline seal 106 may be deformed within the pipeline pipes 102. The head end 542*c* of the lockable pipeline seal 106 may extend a distance further when in the installed position Pi than when in the manufactured position Pe. This indicates that the lockable pipeline seal 106 elongates to an extended length when installed into the pipeline pipes 102. The tail 540*b* and the elongate body 540*c* may extend a distance further when in the manufactured position Pe than when in the installed position Pi. This indicates that the lockable pipeline seal 106 may also compress between the rim 221*c* and the pipeline pipes 102 to a narrowed width about the tail 540*b* and the elongate body 540*c* when installed into the pipeline pipes 102. As shown by FIGS. 6A-6B, the head 540*a* may remain substantially the same, and may be urged into engagement with portions of the pipeline pipes 102 and the raised pipeline sleeve 104 for sealing engagement therewith.

Figure 7A:
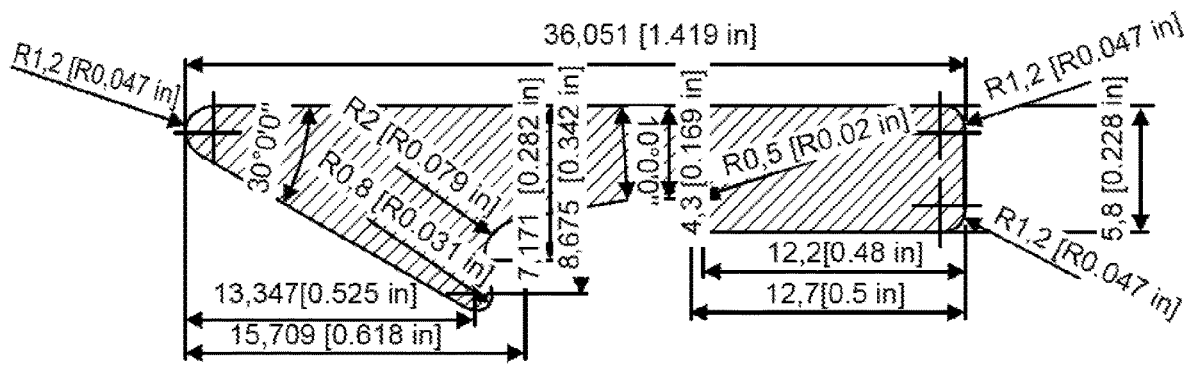
FIGS. 7A-7C are cross-sectional views of the lockable pipeline seal in the manufactured, uninstalled, and installed position, respectively.
Figure 7B:
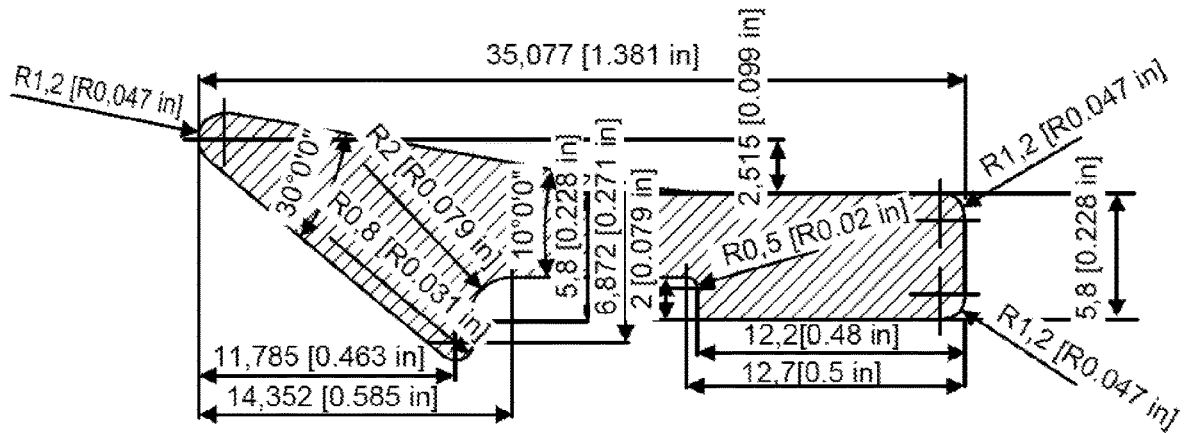
Figure 7C:
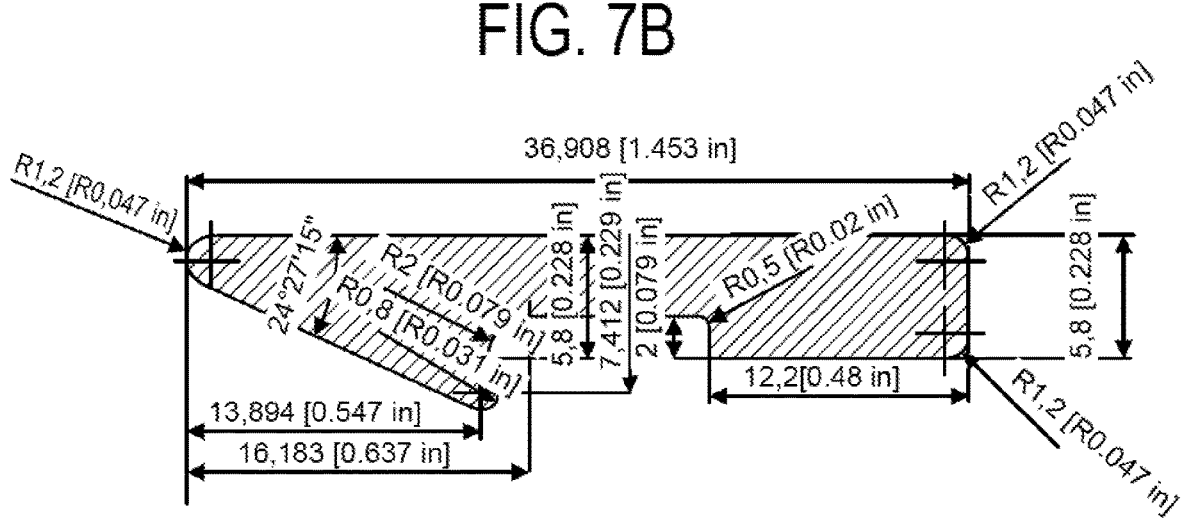

FIGS. 7A-7C are cross-sectional views of the lockable pipeline seal 106 in the manufactured, uninstalled, and installed position, respectively. These figures show details of the lockable pipeline seal 106 in each position, together with example dimensions.

Figure 8:
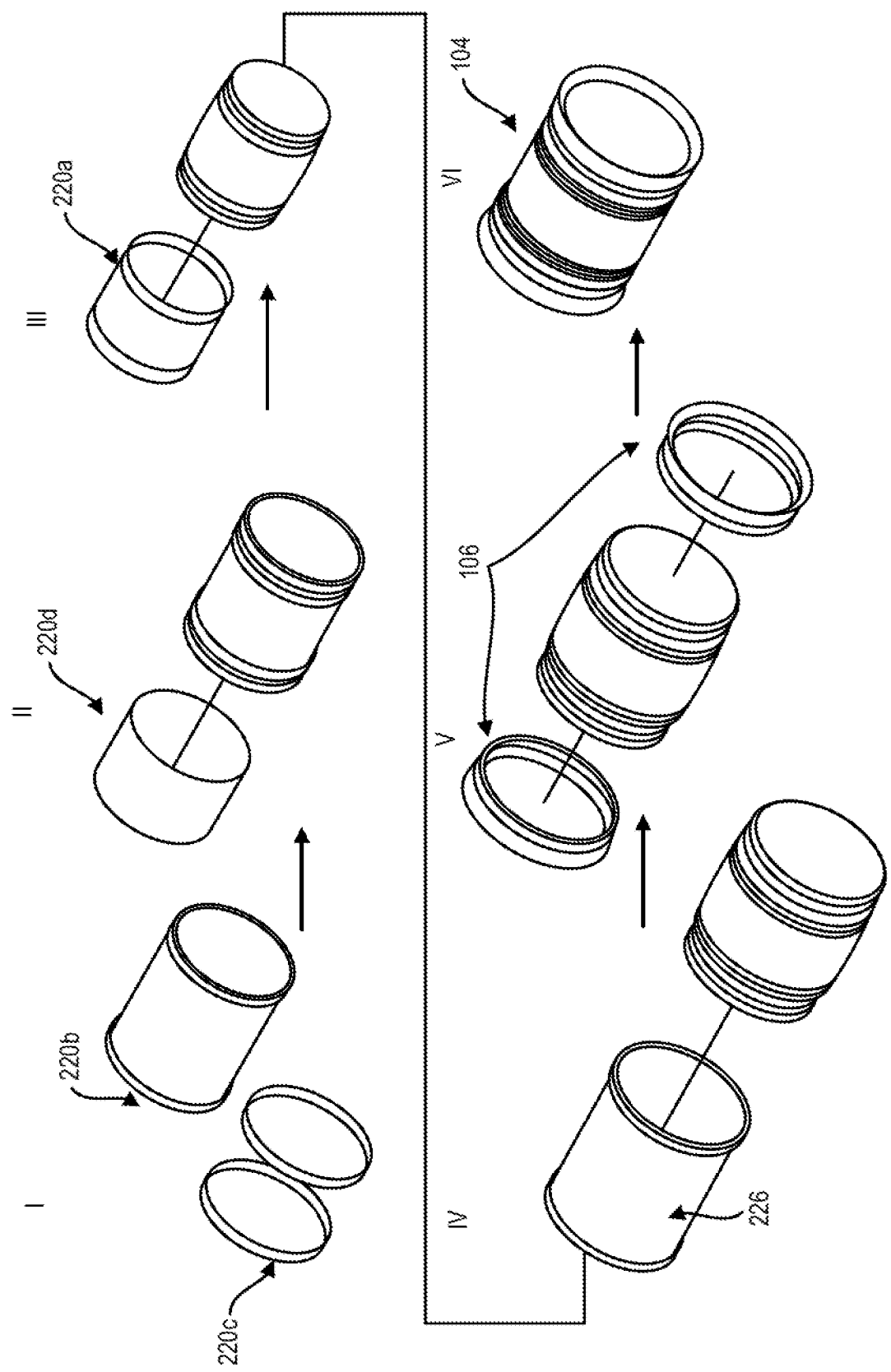
FIG. 8 is a schematic diagram depicting stages of assembly of the raised pipeline seal.

FIGS. 8 and 9A-9D show assembly of the raised pipeline sleeve 104, the pipeline connection 114, and the pipeline 100. FIG. 8 is a schematic diagram depicting stages of assembly of the raised pipeline sleeve 104. FIGS. 9A-9D are schematic diagrams depicting stages of assembly of the pipeline connection 114.

As shown in the example of FIG. 8, the raised pipeline sleeve 104 is assembled by positioning the ring spacers 220*c* onto the inner ring 220*b* at stage I, applying the flex layer 220*d* onto the inner ring 220*b* at stage II, positioning the outer ring 220*a* onto the inner ring 220*b* over the flex layer 220*d* and the ring spacers 220*c* at stage III, applying the sleeve lining 226 onto the inner surface of the inner ring 220*b* at stage IV, and installing the lockable pipeline seals 106 onto the inner ring 220*b* adjacent the outer ring 220*a* and the ring spacers 220*c* at stage V to form the completed raised pipeline sleeve 104 at stage VI.

As shown in FIGS. 9A-9D, the pipeline connection 114 may be formed between adjacent pipeline pipes 102 by inserting the raised pipeline sleeve 104 into the pipeline pipes 102. As shown in FIG. 9A, the raised pipeline sleeve 104 is positioned in axial alignment with the adjacent pair of the pipeline pipes 102 for insertion therein.

As shown in FIG. 9B, the first sleeve end 219*a* of the raised pipeline sleeve 104 is inserted into the first end 218*a* of one of the pipeline pipes 102. As the raised pipeline sleeve 104 advances into the pipeline pipe 102, the raised hump 223*b* and/or the lockable pipeline seal 106 may deform to fit within the pipeline pipe 102. The raised hump 223*b* and/or the lockable pipeline seal 106 may conform to the inner surface 217 of the pipeline pipe 102 as they are inserted therein.

During this advancement, the raised hump 223*b* may be pressed downward against the flex layer 220*d* to allow the raised pipeline sleeve 104 to fit within the pipeline pipes 102, and to engage with the inner surface 217 of the pipeline pipe 102. As shown in FIG. 9B, a portion of the raised hump 223*b* compressed within the pipeline pipe 102 has flattened, and a portion of the raised hump 223*b* outside of the pipeline pipe 102 remains raised.

As shown in FIG. 9C, a second pipeline end 218*b* of another of the pipeline pipes 102 is positioned onto the second sleeve end 219*b* of the raised pipeline sleeve 104. The raised hump 223*b* may also be pressed downward against the flexible layer 220*d* as the pipeline pipe 102 is advanced thereon. The remaining portion of the raised hump 223*b* presses against the flex layer 220*d* and flattens to conform to the inner surface 217 of the pipeline pipe 102. As the raised hump 223*b* is inserted into the pipeline pipe 102, the raised hump 223*b* may also allow the raised pipeline sleeve 104 to adapt to the shape and size of the pipeline pipes 102, and to center within the pipeline pipes 102. The pipeline pipe 102 continues to advance until the pipeline pipes 102 are in abutting engagement with each other. As shown in FIG. 9D, the pipeline pipes 102 are secured together by the weld 215.

While a specific order and configuration of assembly of the raised pipeline sleeve 104 and the pipeline connections 114 are shown, it will be appreciated that the order, positioning, structure, and assembly may vary.

Figure 10B:
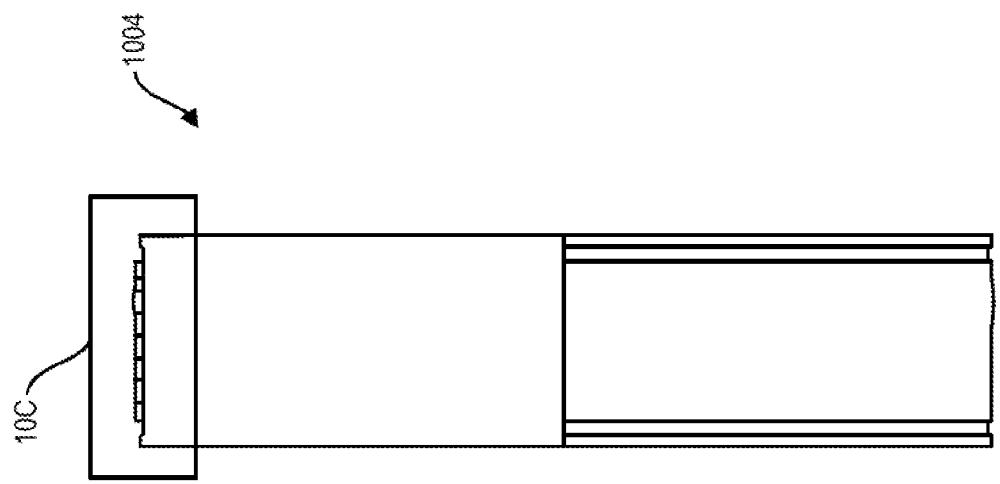
FIGS. 10A-10B are end, partial cross-sectional, and cross-sectional views of portions of a raised pipeline sleeve with an offset hump.
Figure 10A:
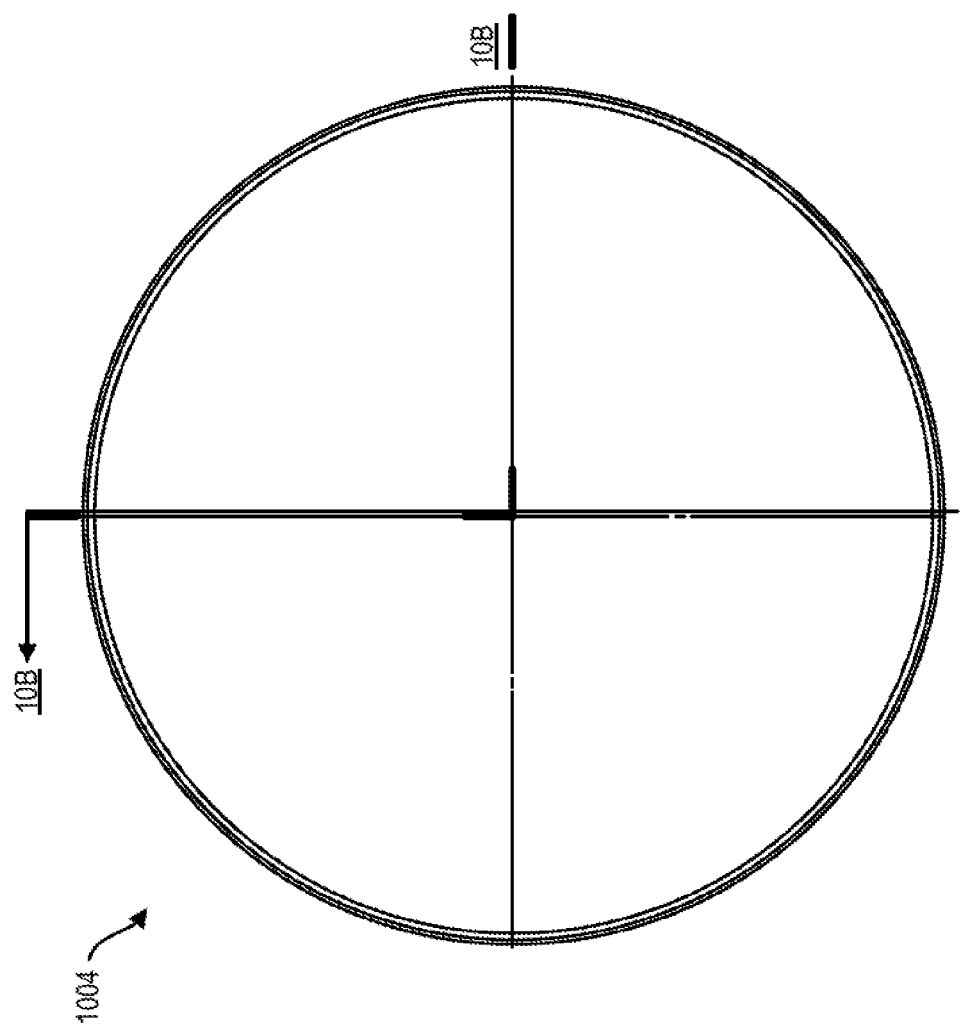
Figure 10C:
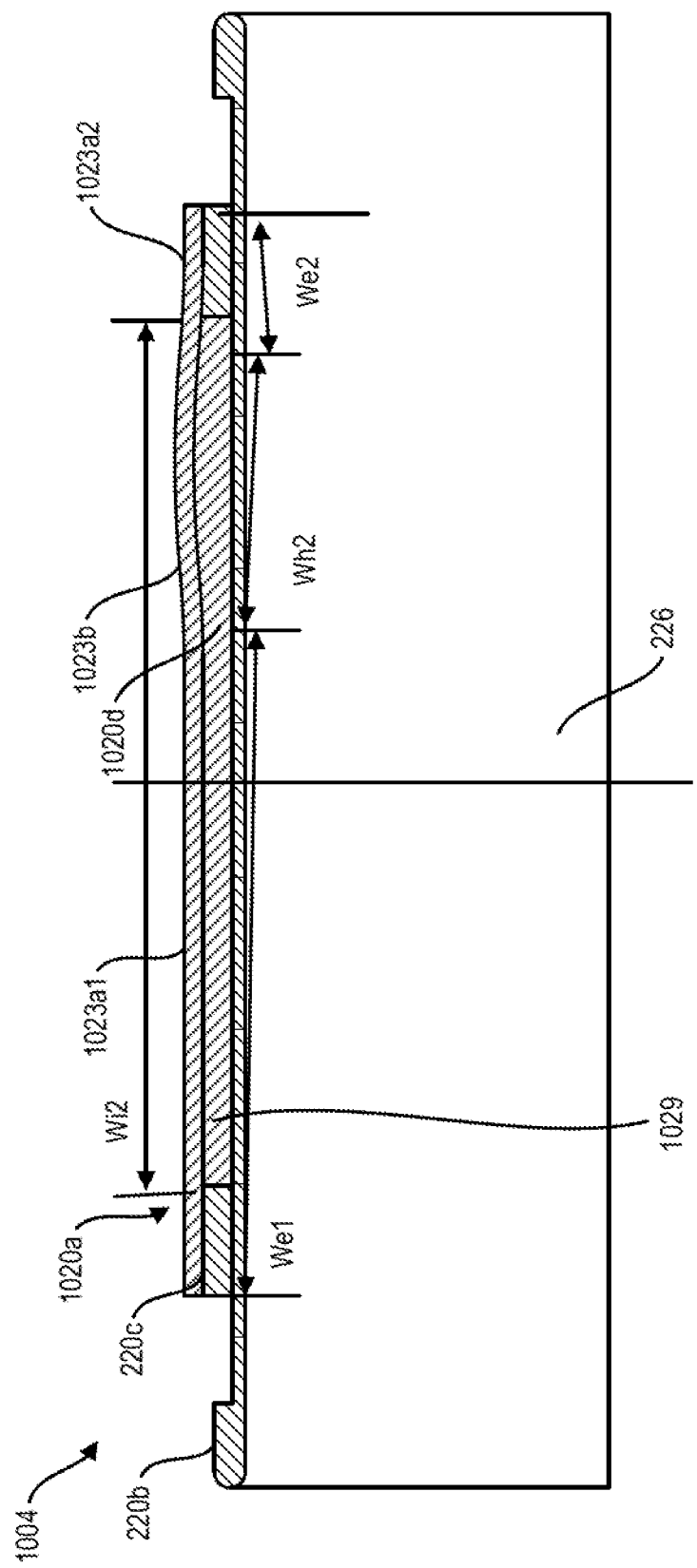
FIG. 10C is a cross-sectional view of portion 10C of FIG. 10B.

FIGS. 10A-11C show other versions of the raised pipeline sleeve 1004, 1104. FIGS. 10A-10C are end, cross-sectional, and detailed views of an offset raised pipeline sleeve 1004. FIG. 10B is a cross-sectional view taken along lines 10B-10B of FIG. 10A and FIG. 10C is a cross-sectional view of portion 10C of FIG. 10B. As shown in FIGS. 10A-10C, the offset (non-central or uncentered) raised pipeline sleeve 1004 and the slim raised pipeline sleeves 1104 each include the inner ring 220b, the ring spacers 220c, and the sleeve liner 226 as previously described.

The offset raised pipeline sleeve 1004 includes a modified outer ring 1020a and a modified flex layer 1020d. The modified outer ring 1020a has an offset raised hump 1023b and outer ends 1023a1, a2. In this version, the offset raised hump 1023b is no longer centered about the outer ring 1020a, and is now closer to the outer end 1023a2 than to the other outer end 1023a1. As a result, the outer end 1023a2 has a width We2 that is less than a width We1 of the outer end 1023a1, and the offset raised hump 1023b has a width Wh2 that is longer than the width We1 and narrower than the width We2. The offset raised hump 1023b is also narrower and has a width We2 that is less than the width We1 of the outer end 1023a1. As a result of the change in shape of the modified outer ring 1020a, the flex layer 1020d has also changed to fit the dimensions. The flex layer 1020d has a width Wi2 to fill the flex cavity 1029 defined by the modified offset outer ring 1020a. The narrower raised hump 1023b may reduce the amount of material that flexes and deforms to fit within the pipeline pipes 102.

The wider outer end 1023a1 and wider gap Gh has a smaller outer diameter than the raised hump 1023b, thereby facilitating insertion of the raised pipeline sleeve 104 over a longer portion of the raised pipeline sleeve 104. The raised pipeline sleeve 104 may then advance further into the pipeline pipe 102 until the raised hump 1023b is engaged. The offset configuration may also be used to position the offset raised hump 1023b adjacent to the inner surface 217 of one of the pipeline pipes 102 for urging the raised hump 1023b into engagement with such pipeline pipe 102. This configuration may also be used to position the offset raised hump 1023b closer to one of the adjacent pipeline pipes 102. This may also extend the size of the gap Gh between the outer ring 1020a and the inner surface 217 of the pipeline pipes 102 one side of the raised hump 1023b and reduce the gap Gh on the other side of the raised hump 1023b (FIG. 2).

FIGS. 11A-11C are end, cross-sectional, and detailed views of a slim raised pipeline sleeve 1104. FIG. 11B is a cross-sectional view taken along lines 11B-11B of FIG. 11A and FIG. 11C is a cross-sectional view of portion 11C of FIG. 11B. The slim raised pipeline sleeve 1104 includes the inner ring 220b, the ring spacers 220c, and the sleeve liner 226 as previously described, as well as a modified outer ring 1120a and a modified flex layer 1120d.

As shown in the example of FIGS. 11A-11C, the modified outer ring 1120a has a slim raised hump 1123b and outer ends 1123a. In this version, the slim raised hump 1123b is centered about the outer ring 1120a. As a result, the outer ends 1123a each have a width We3. Also, as shown in this version, the slim raised hump 1123b is narrower and has a width Wh3 that is less than the width We3 of the outer ends 1123a. This configuration may be used to position the slim raised hump 1123b adjacent the inner surface 217 along a smaller portion of the pipeline pipes 102. This may also extend the size of the gap Gh between the outer ring 1120a and the inner surface 217 of the pipeline pipes 102 (FIG. 2). Also, as a result of the change in shape of the modified outer ring 1120a, the flex layer 1120d has also changed to fit the dimensions. The flex layer 1120d has a width Wi3 to fill the flex cavity 1129 defined by the modified offset outer ring 1120a.

FIGS. 12A-12C show yet another version of the raised pipeline sleeve 1204 with a peak raised hump 1223b. FIG. 12A is a cross-sectional view of a portion of a raised pipeline sleeve 1204 with a peak raised hump 1223b. FIGS. 12B and 12C are cross-sectional views of the pipeline connection 114 and the pipeline 100, respectively, with the peak raised pipeline sleeve 1204 therein for forming the seal 111 therebetween. A lockable pipeline seal 1206 is positioned about the raised pipeline sleeve 1204.

The peak raised pipeline sleeve 1204 includes a modified outer ring 1220a and a modified flex layer 1220d. The modified outer ring 1220a has the peak raised hump 1223b and outer ends 1223a. In this version, the peak raised hump 1223b is centered about the outer ring 1220a. Like the slim raised hump 1123b of FIGS. 11A-3, the peak raised hump 1223b has a narrow width Wh4, and the outer ends 1223a have wider widths We4 (Wh+2*We=Wi4). In this version, the peak raised hump 1223b is a triangular peak terminating at a point a distance above the outer ends 1223a. As a result, the outer ends 1223a2 each have a width We4 that is much greater than a width Wh4 of the peak raised hump 1223b.

This configuration may be used to position the pipeline pipes 102 about the raised pipeline sleeve 104. The pipeline pipes 102 may use the peak raised hump 1223b as a stop for terminating advancement of the pipeline pipes 102 onto the raised pipeline sleeve 104 and/or for determining a center along the raised pipeline sleeve 1204. The peak raised hump 1223b may also provide a sharp tip for engaging the ends of the pipeline pipes 102 as they come together. The narrow tip of the peak raised hump 1223b may also be used to provide a narrow ring about the raised pipeline sleeve 1204, thereby requiring only a narrow portion to compress to fit within the inner surface 217 of the pipeline pipes 102 and allowing a faster compression. This may also extend the size of the gap Gh between the outer ring 1220a and the inner surface 217 of the pipeline pipes 102 (FIG. 2). Also, as a result of the change in shape of the modified outer ring 1220a, the flex layer 1220d has also changed to fit the dimensions. The flex layer 1220d has a width Wi4 to fill the flex cavity 1229 defined by the modified outer ring 1220a.

This version of the raised hump 1223b may be deformed within the pipeline pipes 102, or remain in the raised positioned between the abutted pipeline pipes 102. The weld 215 may then be formed onto the abutted ends of the pipeline pipes 102 and the peak raised hump 1223b, thereby securing the pipeline pipes 102 and the raised pipeline sleeve 104 together.

As described with the lockable pipeline seals of FIGS. 6A and 6B, the lockable pipeline seal 1206 may shift from the uninstalled position Pu of FIG. 12A, to the installed position Pi of FIG. 12B, and to the compressed position Pc in FIG. 12C. As shown in the comparison of FIGS. 12B, 13A-14C, after the raised pipeline sleeve 1204 is installed into the pipeline pipes (FIG. 12B), a compressive fluid may be passed through the passage 112. This compressive fluid may place the installed lockable pipeline seal 1206 under compression, thereby locking the lockable pipeline seal 1206 into sealing engagement with the pipeline pipes 102 and the raised pipeline sleeve 1204 (FIG. 12C).

Figure 13B:
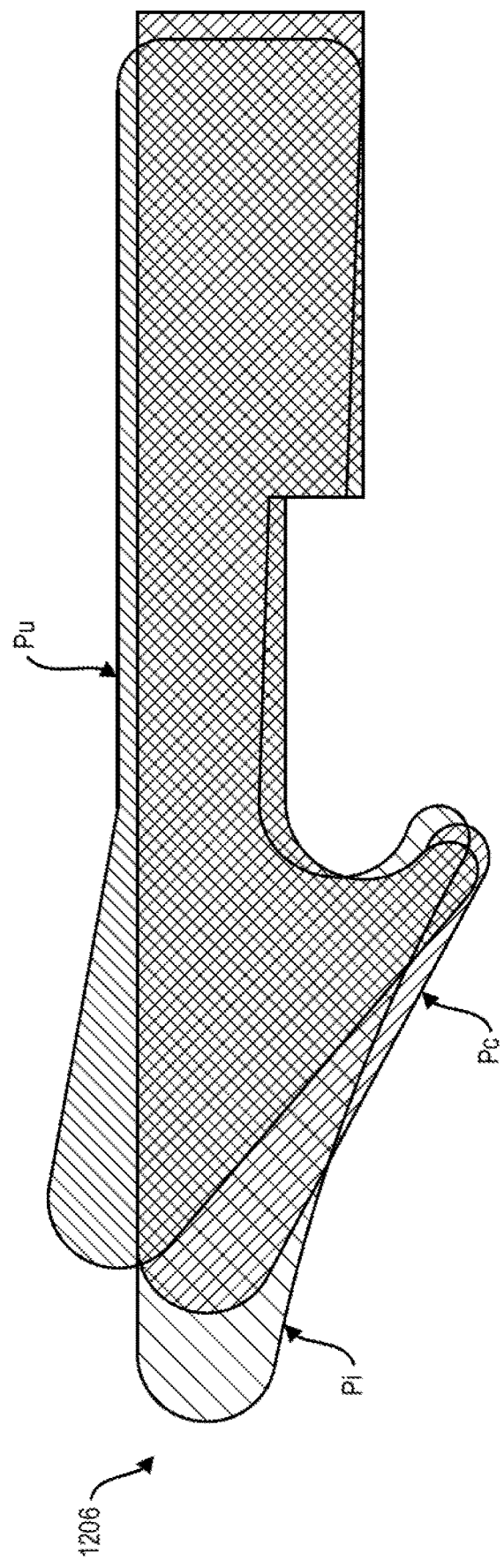
FIG. 13B is a cross-sectional view of the lockable pipeline seal of FIG. 13A.
Figure 14A:
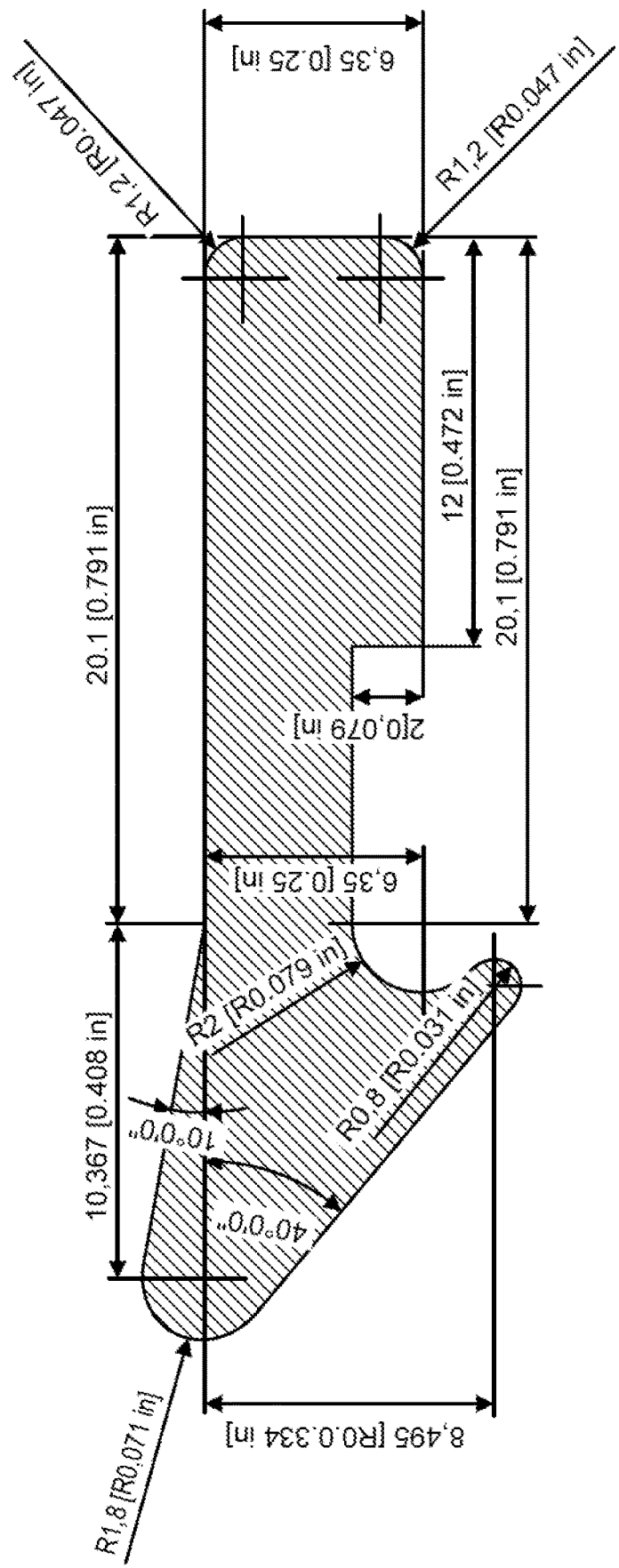
FIGS. 14A-14C are cross-sectional views of the lockable pipeline seal of FIG. 13A in the uninstalled, installed, and compressed position, respectively.
Figure 14B:
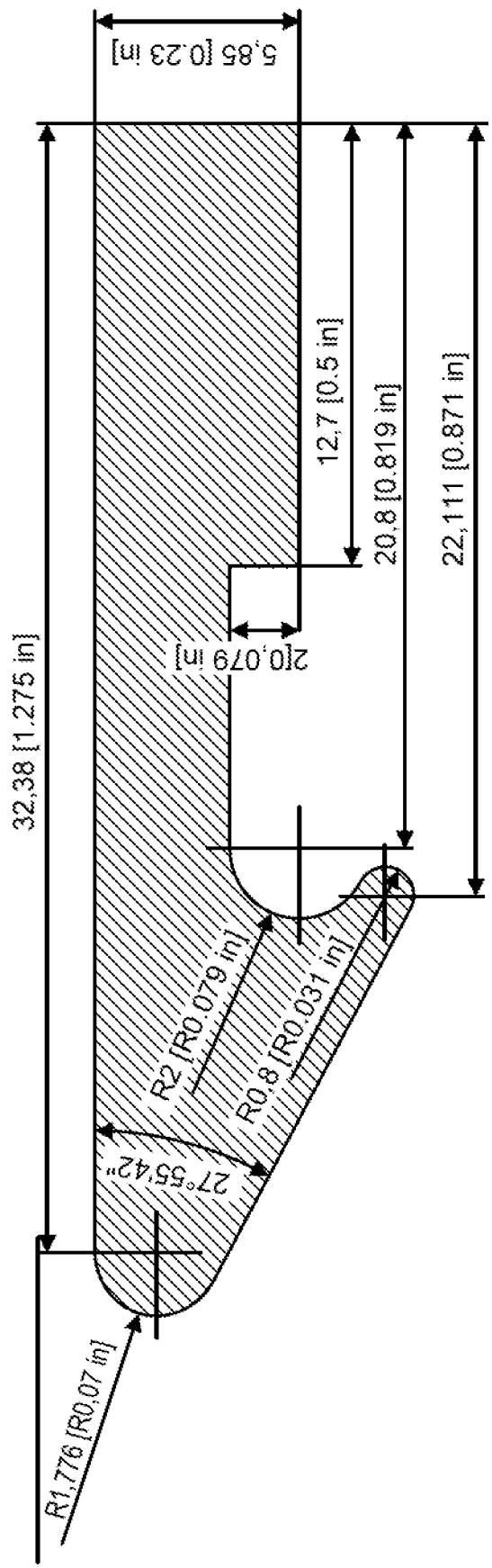
Figure 14C:
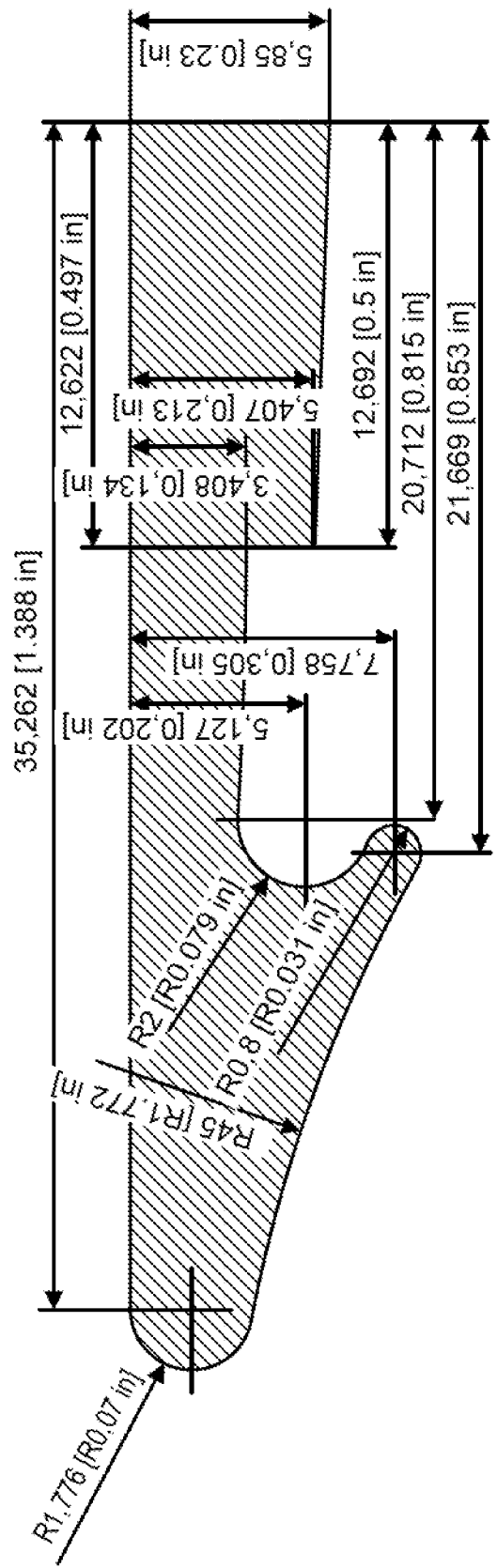

FIGS. 13A-14C show detailed views of the lockable pipeline seal 1206 usable with the raised pipeline sleeves described herein. FIG. 13A is a longitudinal, cross-sectional view of the portion of the pipeline 100 showing the lockable pipeline seal 1206 of FIG. 12A in the uninstalled, the installed, and the compressed position. FIG. 13B is a cross-sectional view of the lockable pipeline seal 1206 of FIG. 13A. FIGS. 14A-14C are cross-sectional views of the lockable pipeline seal 1206 of FIG. 13A in the uninstalled, installed, and compressed position, respectively.

As further shown in FIGS. 13A and 13B, the lockable pipeline seal 1206 may be deformed within the pipeline pipes 102 in a manner similar to the lockable pipeline seal 106 of FIGS. 6A and 6B. In this version, under compression, the head end 1242c extends a distance further towards the spacer 220c, the tail 1240b elongates and engages the pipe lining 216. The tail 1240b also compresses deflects and presses against the pipes 102 such that the outer tail surface becomes concave and a tip 1251 of the tail along the gripping surface 1243 rotates about and grips the rim 221c. The tip 1251 may also seal with the sleeve lining 226.

FIGS. 14A-14C are cross-sectional views of the lockable pipeline seal 1206 in the uninstalled, installed, and compressed positions, respectively. These figures show details of the lockable pipeline seal 1206 in each position, together with example dimensions.

As demonstrated by FIGS. 10A-10C, 11A-11C and 12A-14C, the raised pipeline sleeve may have various configurations as needed to provide the pipeline seal 111 described herein. For example, one or more raised humps, outer ends, outer rings, flex layers, and other features of the pipeline sleeve 104 of various dimensions, positions, and/or configurations may be provided.

FIG. 15 shows an example method that may be performed in accordance with the disclosure. FIG. 15 is a flow chart a depicting a method 1500 of making a pipeline connection 114. As shown in FIG. 15, the pipeline connection 114 (e.g., 100 of FIG. 1) may be made between adjacent pipeline pipes 102 (1590A) by: optionally applying a liner inside of a pair of pipeline pipes, (1590B) forming a raised pipeline sleeve, (1590C) positioning a first sleeve end of the raised pipeline sleeve into a first pipe end of a first of the pair of pipeline pipes, (1590D) positioning a second sleeve end of a raised pipeline sleeve into a second pipe end of a second of the pair of pipeline pipes, (1590E) forming a sealed pipeline connection between the raised pipeline sleeve and first and second pipeline pipes, and (1590F) with the raised pipeline sleeve positioned therein, securing the first pipe end of the first pipeline pipe to the second pipe end of the second pipeline pipe.

The method 1500 may also involve forming the raised pipeline sleeve (1590B) by: positioning rims on each end of an inner ring, positioning a flexible layer on an outer surface of the inner ring, positioning the inner ring with the ring spacers and the flexible layer thereon into an outer ring, (optionally) applying a liner to an inner surface of the inner ring, and positioning lockable pipeline seals onto each of the inner ring adjacent to the rims. The (1590E) forming may involve installing a first end of the raised pipeline sleeve into a first end of a first of the pipeline pipes and installing a second end of the raised pipeline sleeve into a second of the second of the pipeline pipes; forming a seal between the pipeline seal, the raised pipeline sleeve, and each of the pipeline pipes; and compressing the raised hump against the inner surface of the pipeline pipes such that the tubular sleeve body is aligned (e.g., centered radially) about the pipeline pipes and the central portion is urged into sealing engagement with the pipeline pipes.

Part or all of the techniques may be performed at various locations. Portions of the method may be performed in various orders, and part or all may be repeated.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top", "bottom", "anterior" and "posterior" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

While the embodiments are described with reference to various implementations and exploitations, it will be understood that these embodiments are illustrative and that the scope of the inventive subject matter is not limited to them. Many variations, modifications, additions and improvements are possible. For example, various combinations of one or more of the features and/or methods provided herein may be used.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter. For example, while certain connectors are provided herein, it will be appreciated that various forms of connection may be provided. While the figures herein depict a specific configuration or orientation, these may vary. First and second are not intended to limit the number or order.

What is claimed is:

1. A raised pipeline sleeve for sealing pipeline pipes of a pipeline, the raised pipeline sleeve comprising:
   a tubular sleeve body insertable into the pipeline pipes, recessed sleeve shoulders radially positioned about each end of the tubular sleeve body with a central portion therebetween, an outer surface of the tubular sleeve body along the central portion shaped to conform to an inner surface of the pipeline pipes, the recessed sleeve shoulders being recessed a distance radially below the central portion to support a pipeline seal between the recessed sleeve shoulders and the pipeline pipes, a raised hump extending radially from the central portion along the outer surface of the tubular sleeve body;

wherein, as the tubular sleeve body is inserted in the pipeline pipes, the pipeline pipes engage the raised hump and conform the raised hump to the inner surface of the pipeline pipes whereby installation of the tubular sleeve body into and alignment of the tubular sleeve body about the pipeline pipes is facilitated;

wherein each of the recessed sleeve shoulders comprises a rim and a recess, the recess positioned between the rim and the central portion.

2. The raised pipeline sleeve of claim 1, wherein the central portion has outer ends with the raised hump therebetween, the outer ends having an outer diameter less than an outer diameter of the raised hump, the outer diameter of the outer ends sized to facilitate insertion into the pipeline pipes, the outer diameter of the raised hump sized to limit advancement of the pipeline pipes.

3. The raised pipeline sleeve of claim 2, wherein a width of raised hump is one of greater than and less than a width of the outer ends.

4. The raised pipeline sleeve of claim 1, wherein, when the tubular sleeve body is inserted into the pipeline pipes and the pipeline pipes are moved together, the raised hump defines a bridge between the pipeline pipes, between the central portion of the raised pipeline sleeve and the pipeline pipes.

5. The raised pipeline sleeve of claim 1, wherein the tubular sleeve body comprises an inner ring and an outer ring.

6. The raised pipeline sleeve of claim 5, wherein the tubular sleeve body further comprises ring spacers between the inner ring and the outer ring.

7. The raised pipeline sleeve of claim 5, wherein the tubular sleeve body further comprises a flexible layer between the inner ring and the outer ring.

8. The raised pipeline sleeve of claim 7, wherein the flexible layer comprises an insulative material.

9. The raised pipeline sleeve of claim 1, wherein the pipeline seals are receivably positioned about the recessed sleeve shoulders, each of the pipeline seals comprising a ring-shaped body shaped to form a seal between the tubular sleeve body and the pipeline pipes.

10. The raised pipeline sleeve of claim 9, wherein the ring-shaped body has a head along a first edge of the ring-shaped body and a tail along a second edge of the ring-shaped body with a elongate body between the head and the tail.

11. The raised pipeline sleeve of claim 10, wherein the ring-shaped body has an outer ring surface and an inner ring surface, a deflection surface defined along the outer ring surface, the deflection surface at an angle to a horizontal axis of the ring-shaped body, a grip defined along the inner ring surface and the elongate body between the head and the tail.

12. The raised pipeline sleeve of claim 1, further comprising a sleeve lining along an inner surface of the tubular sleeve body.

13. The raised pipeline sleeve of claim 1, wherein the central portion has a thickness greater than the rim and the rim has a thickness greater than the recess.

14. The raised pipeline sleeve of claim 1, wherein a step is defined between the central portion and each of the recesses.

15. The raised pipeline sleeve of claim 1, wherein the raised hump is positioned centrally between each of the recessed sleeve shoulders.

16. The raised pipeline sleeve of claim 1, wherein the raised hump is positioned non-centrally between each of the recessed sleeve shoulders.

17. The raised pipeline sleeve of claim 1, wherein the raised hump comprises at least one of a peak, an offset hump, a narrow hump, and a wide hump.

18. A sealed pipeline connection, comprising:
pipeline pipes with a fluid passage therethrough, a first end of a first of the pipeline pipes positioned adjacent a second end of a second of the pipeline pipes;
a raised pipeline sleeve, comprising:
a tubular sleeve body insertable into the pipeline pipes, recessed sleeve shoulders radially positioned about each end of the tubular sleeve body with a central portion therebetween, an outer surface of the tubular sleeve body along the central portion shaped to conform to an inner surface of the pipeline pipes, the recessed sleeve shoulders being recessed a distance radially below the central portion, a raised hump extending radially from the central portion along the outer surface of the tubular sleeve body;
wherein, as the tubular sleeve body is inserted in the pipeline pipes, the pipeline pipes engage the raised hump and conform the raised hump to the inner surface of the pipeline pipes whereby installation of the tubular sleeve body into and alignment of the tubular sleeve body about the pipeline pipes is facilitated; and
pipeline seals positioned between the recessed sleeve shoulders and the pipeline pipes;
wherein each of the recessed sleeve shoulders comprises a rim and a recess, the recess positioned between the rim and the central portion.

19. The sealed pipeline connection of claim 18, wherein the raised pipeline sleeve extends into the first end of the first of the pipeline pipes and the second end of the second of the pipeline pipes.

20. The sealed pipeline connection of claim 18, wherein the pipeline seals are lockable pipeline seals and wherein, when compressed fluid passes through the fluid passage, the pipeline seals are compressed against the pipeline pipes and the raised pipeline sleeve.

21. The sealed pipeline connection of claim 18, wherein, when the tubular sleeve body is inserted into the pipeline pipes and the pipeline pipes move together, the raised hump defines a bridge between the pipeline pipes.

22. The sealed pipeline connection of claim 18, further comprising a weld between the pipeline pipes and the raised hump.

23. A method of making a sealed pipeline, comprising:
providing a raised pipeline sleeve having a tubular sleeve body, the tubular sleeve body having recessed shoulders at each end with a central portion therebetween, the central portion having a raised hump thereon, each of the recessed sleeve shoulders comprising a rim and a recess, the recess positioned between the rim and the central portion;
installing a pipeline seal onto each of the recessed shoulders of the raised pipeline sleeve;
forming a sealed pipeline connection between the raised pipeline sleeve and first and second pipeline pipes by:
installing a first end of the raised pipeline sleeve into a first end of a first of the pipeline pipes and installing a second end of the raised pipeline sleeve into a second end of a second of the pipeline pipes;

forming a seal between the pipeline seals, the raised pipeline sleeve, and the pipeline pipes; and facilitating installation and alignment of the tubular sleeve body into the pipeline pipes by engaging and conforming the raised hump to an inner surface of the pipeline pipes as the tubular sleeve body is inserted in the pipeline pipes.

24. The method of claim 23, further comprising during the forming, flexing the central portion of the raised pipeline sleeve.

25. The method of claim 23, further comprising forming the raised pipeline sleeve by positioning a first ring about a second ring.

26. The method of claim 25, further comprising, before positioning the first ring about the second ring, applying a flexible layer to the second ring.

27. The method of claim 25, further comprising, before positioning the first ring about the second ring, positioning ring spacers at each end of the second ring and applying a flexible layer between the ring spacers.

28. The method of claim 23, further comprising applying a liner to one of the raised pipeline sleeve, the pipeline pipes, and combinations thereof.

29. The method of claim 28, further comprising forming a sleeve seal between the pipeline seal and the liner of one of the raised pipeline sleeve, the pipeline pipes, and combinations thereof.

30. The method of claim 23, further comprising locking the pipeline seals into sealing engagement with the pipeline pipes and the raised pipeline sleeve by passing a compressible fluid through the pipeline pipes.

31. The method of claim 23, further comprising securing the pipeline pipes together.

32. The method of claim 23, further comprising applying a weld about the first end of the first pipe, the second end of the second pipe, and the raised hump.

* * * * *